United States Patent [19]

Thaler et al.

[11] 3,928,297

[45] Dec. 23, 1975

[54] HIGH MOLECULAR WEIGHT, HIGH UNSATURATION ISOBUTYLENE-CONJUGATED DIENE COPOLYMERS

[75] Inventors: Warren A. Thaler, Matawan; Donald J. Buckley, Plainfield, both of N.J.; Joseph P. Kennedy, Akron, Ohio

[73] Assignee: Exxon Research and Engineering Company, Linden, N.J.

[22] Filed: Apr. 1, 1974

[21] Appl. No.: 457,109

Related U.S. Application Data

[63] Continuation-in-part of Ser. No. 151,038, June 8, 1971, Pat. No. 3,808,177.

[52] U.S. Cl. .................... 260/85.3 R; 260/23.7 M; 260/79.5 B; 260/79.5 R; 260/80.7; 260/85.3 C
[51] Int. Cl.² ...................................... C08F 210/12
[58] Field of Search ............... 260/85.3 R, 85.3 C; 450/744

[56] References Cited
UNITED STATES PATENTS

| | | | |
|---|---|---|---|
| 2,561,729 | 7/1951 | Dornte | 260/85.3 |
| 2,577,822 | 12/1951 | Sparks et al. | 260/80.7 |
| 2,626,940 | 1/1953 | Sparks et al. | 260/29.1 |
| 2,772,255 | 11/1956 | Ernst et al. | 260/85.3 |
| 3,080,337 | 3/1963 | Sherwood et al. | 260/45.5 |
| 3,219,641 | 11/1965 | Tegge et al. | 260/80.7 |
| 3,239,495 | 1/1966 | Small et al. | 260/80.7 |
| 3,242,147 | 3/1966 | Parker | 260/80.7 |
| 3,511,821 | 5/1970 | Parker et al. | 260/80.7 |
| 3,808,177 | 4/1974 | Thaler et al. | 260/80.7 |

FOREIGN PATENTS OR APPLICATIONS

| | | | |
|---|---|---|---|
| 1,036,618 | 7/1966 | United Kingdom | 260/85.3 |

*Primary Examiner*—Stanford M. Levin
*Attorney, Agent, or Firm*—Henry E. Naylor

[57] ABSTRACT

Substantially gel-free, high molecular weight, high unsaturation copolymers of isobutylene and conjugated dienes having a number average molecular weight of at least 120,000 and a mole percent of unsaturation of at least 5 percent and the process for preparing said polymers which comprises carrying out the polymerization in a homogeneous phase, introducing the catalyst comprising an aluminum halide to the system in a soluble form and carrying the reaction out at a temperature of less than −100°C.

10 Claims, 9 Drawing Figures

INFLUENCE OF TEMPERATURE ON MOLECULAR WT.
20% n-HEPTANE COSOLVENT
FOR A B15 ISOBUTYLENE-ISOPRENE COPOLYMER

EFFECT OF M̄n ON TENSILE STRENGTH

PERMEABILITY TO AIR OF ISOBUTYLENE-ISOPRENE COPOLYMERS

PERMEABILITY AS A FUNCTION OF
DIOLEFIN CONTENT OF AN ISOBUTYLENE COPOLYMER

HIGH MOLECULAR WEIGHT, HIGH UNSATURATION ISOBUTYLENE-CONJUGATED DIENE COPOLYMERS

REFERENCE TO RELATED APPLICATIONS

This application is a continuation-in-part application 1971 Ser. No. 151,038, filed June 8, 1971, and now U.S. Pat. No. 3,808,177.

BACKGROUND OF INVENTION

Polymers and copolymers of isobutylene are well known in the art. In particular, copolymers of isobutylene with conjugated multiolefins have found wide acceptance in the rubber field. These polymers are generally termed in the art "butyl rubber." The preparation of butyl rubber is described in U.S. Pat. No. 2,356,128, which is incorporated herein by reference.

The term "butyl rubber" as employed in the specification is intended to include copolymers made from the polymerization of a reaction mixture comprising an isoolefin having about 4 to 7 carbon atoms, e.g. isobutylene and a conjugated multiolefin having about 4 to 14 carbon atoms, e.g. isoprene. Although these copolymers are said to contain about 0.2 to about 15 percent combined multiolefin, in practice the butyl rubber polymers of commerce contain about 0.6 to about 4.5 wt. percent of multiolefin; more generally, about 1.0 to about 1.8 wt. percent, the remainder of the polymer being comprised of the isoolefin component.

Efforts to prepare isoolefin-multiolefin polymers of high unsaturation have met with varying degrees of success. Where substantially gel-free polymers have been prepared containing more than about 5 percent multiolefin, the polymers have been of low number average molecular weight. This has been true even where these polymers had high viscosity average molecular weights. In general, however, the products formed by prior art processes are either high in gel content or low in number average molecular weight and of little utility. In order to have practical commercial utility as a synthetic rubber, the isobutylene-multiolefin copolymers must be substantially gel-free and have a number average molecular weight of at least 120,000.

Multiolefins are known to be molecular weight and catalyst poisons; furthermore, increased unsaturation in the polymer backbone provides potential sites for gelation. Hence, attempts to prepare more highly unsaturated isoolefin-multiolefin copolymers by prior art methods have resulted in the formation of either low molecular weight or resinous crosslinked polymers which have little or no commercial utility as elastomers.

Although some commercial elastomers such as styrene butadiene rubber or EPDM may contain as much as 2 to 9 percent gel, isobutylene copolymers of commerce are substantially gel free. The isobutylene copolymers may contain as much as 2 percent gel but preferably contain less than 1 percent.

There are numerous patents and literature disclosures which generally disclose polymers and copolymers of isobutylene the copolymers purportedly having from about 0.5 to 98 percent unsaturation. Where the prior art copolymers are high in unsaturation, however, they are either low in number average molecular weight or resinous.

Japanese Pat. No. JA27416/68 published 11/26/68 teaches a process for preparing copolymers of conjugated diene compounds with isobutylene which contain "a large amount of conjugated diene compounds" using catalysts prepared by reacting (1) mercuric halide, aluminum halide or hydrogen halide, (2) zirconium halide and (3) aluminum metal in the presence of an aromatic compound, e.g. benzene. These products are described as copolymers which are "rubbery substances when the isobutylene is high and are resinous when the isobutylene content is low." The resinous properties result from gelation and crosslinking of the polymer during its preparation. These gelled and crosslinked products have little utility as rubbers. The products of lower unsaturation, i.e. high isobutylene content rubbers, are of the conventional butyl rubber type.

Japanese Pat. No. JA27417/68 published 11/26/68 teaches a method for preparing copolymers of dienes and isoolefins containing about 0.1 to about 40 wt. percent, preferably about 0.5 to 5 wt. percent of diene. The polymers are prepared using a catalyst derived from (1) metal oxides of the general formula $M_xO_y$, wherein M is nickel or cobalt and $1 \leq y/x 1.5$, and (2) aluminum halide. Again, the low unsaturation polymers are the conventional butyl rubbers whereas the highly unsaturated materials are either low in number average molecular weight or are gelled polymers.

U.S. Pat. No. 3,356,661 teaches a method for preparing copolymers of isobutylene and butadiene-1,3 hydrocarbons, for example copolymers of isoprene and isobutylene. The copolymers produced by the process disclosed are either lower molecular weight, i.e. less than 100,000 viscosity average molecular weight or gelled polymers.

U.S. Pat. No. 3,165,503 teaches a method for polymerizing butadiene-1,3 hydrocarbons, e.g., isoprene. The invention of this patent is directed primarily towards the preparation of polyisoprene. However, copolymers of isoprene and isobutylene are disclosed. The preferred copolymers are said to contain from about 1 to 50 wt. percent of butadiene-1,3 hydrocarbon units. Hydrocarbon copolymers of isoolefin and conjugated dienes prepared by the method taught by the patentee are found to be low in number average molecular weight or gelled polymers.

U.S. Pat. No. 3,466,268 and its parent counterpart, U.S. Pat. No. 3,357,960 disclose a butadiene isobutylene copolymer and a process for preparing said copolymer. The invention disclosed is a method of improving butadiene polymers by incorporating in the structure varying amounts of isobutylene. Preferably, the amount of isobutylene incorporated is said to be about 2 to 40 wt. percent. The polymers disclosed are generally low in number average molecular weight. Substitution of isoprene for butadiene results in highly crosslinked copolymers which have little utility.

U.S. Pat. No. 2,772,255 (Br. 744,514) discloses a method for preparing high molecular weight butyl rubbers. In general, the polymers which are prepared are conventional butyl rubbers having less than 3 mole percent unsaturation. Attempts to produce butyl rubber type polymers having unsaturation in excess of 5 mole percent unsaturation result in products which either are low in number average molecular weight or are gelled and highly crosslinked.

High unsaturation isobutylene-isoprene copolymers have been prepared (see, for example, U.S. Pat. No. 3,242,147 incorporated herein by reference). Although these polymers are purportedly high in viscosity average molecular weight, the number average molecular weights are low. Hence, the products have little commercial significance.

Unlike plastics, elastomers require a high number average molecular weight in order to realize desirable levels in physical properties. For example, tensile strength for elastomers is critically dependent on number average molecular weight since these polymers are used well above their glass transition temperature and are generally amorphous.

In contrast to elastomers, plastics are used well below their glass transition temperature and it is molecular associations which gives them their structural integrity. As a result, number average molecular weights in the order of 10,000 to 70,000 are adequate for commercial utility.

Elastomers, on the other hand, obtain their structural integrity from a crosslinked network. Perfection of this network is directly dependent on the length of the polymer molecules from which the network is derived. Number average molecular weight ($\overline{M}n$) is a measure of the length of the molecules. Viscosity or weight average molecular weights are misleading measurements since their numerical value is greatly affected by small variations in the distribution of the higher molecular weight fractions. Hence, polymers of low number average molecular weight may have high viscosity average molecular weight as a result of disproportionate distribution of the high molecular weight fraction.

The importance of number average molecular weight on tensile strength has long been recognized (see, for example, Flory, p. 5, Ind. Eng. Chem., 38, 417 (1946), incorporated herein by reference. Flory showed that for low unsaturation elastomeric copolymers of isobutylene tensile strength increased rapidly as the number average molecular weight was increased beyond a minimum value (i.e. 100,000) then approaches an asymptotic limit.

For economic reasons, oil extendability is an essential characteristic of a commercial elastomer for almost all major uses. The tensile strength of butyl rubber vulcanizates is reduced by the addition of oil, and to retain the original tensile strength of the undiluted composition it is necessary to increase the number average molecular weight. Oil extension also improves the low temperature properties of butyl innertubes and when this phenomenon was discovered, it was necessary to develop higher molecular weight polymers to accommodate the added oil. See, for example, Buckley et al, Ind. Eng. Chem., 42, 2407 (1950).

This finding resulted in the rapid adoption by industry of the high molecular weight type of butyl GR-1-18 with Mooney viscosity greater than 71 (212°F.). These materials generally have number average molecular weights of 150,000 or greater. In contrast, the previously used polymers which have number average molecular weights of less than 120,000 with Mooney viscosity sppecification of 38–49 (212°F.) were limited to applications which did not require oil extension, and today represents a very minor portion of the butyl rubber market having been supplanted almost entirely by the higher molecular weight butyl rubbers.

Although it has been postulated that higher unsaturation copolymers of isobutylene would be attractive polymers, useful polymers have not been available since the prior art methods are not capable of producing highly unsaturated, e.g., at least 5 mole percent to about 40 mole percent, isobutylene copolymers of sufficiently high number average molecular weight, e.g., at least 120,000. Hence, the prior art isobutylene-conjugated diene copolymers offered commercially are low in unsaturation, e.g., 1–4.5 mole percent.

Hence, heretofore, methods of preparing copolymers of isoolefins and conjugated dienes have not included a means for making commercial quality elastomers containing greater than 5 mole percent diene. To be of commercial quality the elastomer must be substantially gel free and have a number average molecular weight ($\overline{M}n$) of at least 120,000.

Although the isobutylene-conjugated dienes of commerce have improved ozone resistance, these polymers are still subject to ozone cleavage since the site of unsaturation is in the polymer backbone. It has been postulated that isobutylene copolymers having unsaturation on the side chain rather than the backbone would be highly resistant to ozone attack. Attempts to produce such polymers using cyclopentadiene as the diene comonomer have been notably unsuccessful.

Isobutylene-cyclopentadiene copolymers of the prior art have been too low in molecular weight to be of commercial significance. Some improvement in molecular weight has been accomplished by copolymerizing isobutylene with minor amounts of cyclopentadiene (CPD) along with other monomers including crosslinking agents such as divinyl benzene. The resulting products are somewhat improved terpolymers or tetrapolymers resulting from the linking of the low molecular weight isobutylene-CPD chains into two dimensional highly branched polymers. Such polymers, however, have inferior physical properties as compared to the butyl rubbers of commerce and hence have not gained acceptance.

A review of the art illustrates the problems encountered where attempts were made to prepare copolymers of isobutylene and cyclopentadiene (CPD). For example, U.S. Pat. No. 2,577,822, incorporated herein by reference, teaches the need for the addition of divinyl benzene in order to compensate for the deleterious effect of CPD on molecular weight.

U.S. Pat. No. 3,080,337, incorporated herein by reference, teaches the addition of isoprene as a third monomer but the resulting products are low in unsaturation and have poor physical properties. Others have made various attempts to produce CPD isoolefin copolymers with varying degrees of success; see, for example, U.S. Pat. Nos. 3,239,495; 3,242,147; 2,521,359; British Pat. No. 1,036,618 and I & EC Prod R and D 1, 216–20 (1962) incorporated herein by reference. These polymers, however, have substantially no commercial significance because, even when only minor amounts of CPD were present, they are low in number average molecular weight.

SUMMARY OF INVENTION

It has surprisingly been found that substantially gel-free copolymers of isoolefins and conjugated diolefins having a mole percent unsaturation of at least 5 percent and a number average molecular weight ($\overline{M}n$) of at least 120,000 may be prepared by carrying out the polymerization in the presence of not more than about 40 wt. percent, based on the total monomer plus cosolvent, of a cosolvent which is a solvent for the polymer at the polymerization temperature and carrying out the reaction at a temperature of less than −100°C. The catalyst must be an aluminum halide and must be introduced into the reaction zone dissolved in a polar solvent.

The quantity of cosolvent used is kept to a minimum in order to maximize molecular weight. The optimum cosolvent level is determined by selecting the minimum solvent-monomer ratio at which the copolymer to be prepared remains in solution at the polymerization temperature.

Surprisingly, the process of this invention makes it possible to prepare isobutylene-cyclopentadiene (CPD) copolymers of high number average molecular weight. Terpolymers of isobutylene, CPD and a third conjugated multiolefin have unexpected ozone resistance.

BRIEF DESCRIPTION OF DRAWINGS

FIG. I is a plot of the Critical Homogeneous Polymerization Temperature as a function of multiolefin content.

FIG. II is a graphical representation of the effect of cosolvent concentration on number average molecular weight.

Figure 1:
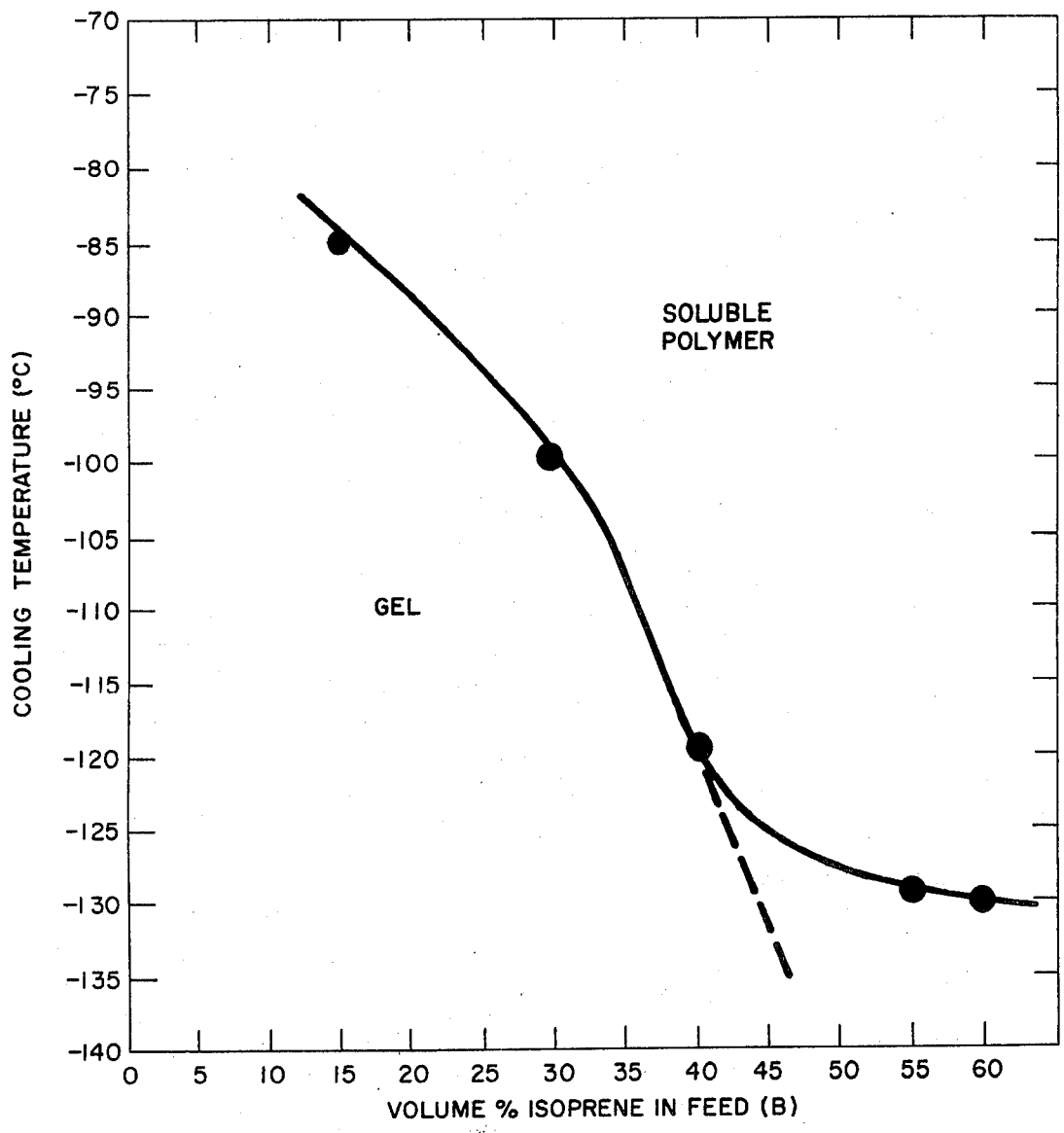

FIG. III is a graphical representation of the effect of polymerization temperature on molecular weight.

FIG. IV is a graphical representation of the relationship between Mooney Viscosity and number average molecular weight for isobutylene-isoprene (B15) copolymers.

FIG. V is a graphical representation of the effect of number average molecular weight on tensile strength.

FIG. VI is a graphical representation of the permeability to air of isobutylene-isoprene copolymers as a function of isoprene content.

FIG. VII is a graphical representation of the permeability to air of various copolymers and terpolymers as a function of multiolefin content.

FIG. VIII is a graphical representation of the crosslink concentration as a function of cure time for various copolymer compositions.

FIG. IX is a graphical representation of the effect of multiolefin content on vulcanization characteristics.

DETAILED DESCRIPTION

This invention relates to a method of preparing substantially gel-free copolymers of an isoolefin and a conjugated multiolefin wherein said copolymers have a number average molecular weight of at least 120,000 and a mole percent unsaturation of at least 5 percent. The preferred polymers of this invention have a number average molecular weight of at least 130,000; more preferably at least 140,000; most preferably 150,000; e.g., at least 160,000.

In the preparation of the copolymers of this invention any cationically polymerizable multiolefin may be copolymerized with a cationically polymerizable isoolefin.

The isoolefins suitable for use in the practice of the inventions are preferably hydrocarbon monomers having about 4 to about 10 carbon atoms. Illustrative nonlimiting examples of these isoolefins are isobutylene, 2-methyl-1-butene, 3-methyl-1-butene, 4-methyl-1-pentene, beta-pinene, etc. Preferably, the isoolefin is isobutylene.

The multiolefins suitable for use in this invention are conjugated hydrocarbon multiolefins having 5 to about 14 carbon atoms; more preferably, the multiolefins are conjugated diolefins of 5 to 9 carbon atoms. Illustrative nonlimiting examples of these multiolefins are isoprene, piperylene, 2,3-dimethyl butadiene, 2,5-dimethylhexadi-2,4-ene, cyclopentadiene, cyclohexadiene, methylcyclopentadiene, fulvene, etc.

In order to obtain number average molecular weights of at least 120,000, the reaction must be carried out below $-100°C.$, preferably about $-110°$ to $-140°C.$, more preferably about $-110°C.$ to about $-135°C.$, most preferably about $-115°$ to $-130°C.$, e.g. $-120°C.$ To obtain the desired number average molecular weight in a substantially gel-free polymer, a homogeneous polymerization is required. This is achieved by carrying out the reaction in a vehicle which is a solvent for the copolymer at the reaction temperature. The vehicle comprises predominantly the monomers to be polymerized in conjunction with an inert cosolvent or mixtures of inert cosolvents. The vehicle (monomers plus cosolvent) must of course be liquid at the polymerization temperature.

It is essential in carrying out the process of this invention that the cosolvent comprise at least 5 percent by volume and not more than 40 percent by volume of the total cosolvent-monomer system. Preferably, about 5 to about 30 volume percent cosolvent is used; more preferably about 7.5 to 25 volume percent, most preferably about 10 to about 20 volume percent, e.g., 15 volume percent.

The optimum amount of cosolvent to be used is the minimum amount necessary to avoid gelation. If too little cosolvent is used gelation of the product results. Too high a level results in undesirable lowering of number average molecular weight.

For the purposes of this invention, it is convenient to define the volume percent of inert cosolvent as that calculated based on the volume of monomers at the polymerization temperature while the volume of cosolvent is determined at 25°C. The volume percent of cosolvent as calculated is uncorrected for volume changes and cooling of the cosolvent to reaction conditions.

The minimum quantity of a given cosolvent required to produce gel-free polymers is a function of the cosolvent, the conjugated multiolefin used and the polymerization temperature. Having selected the composition of the blend of monomers and the cosolvent to be used the minimum quality of cosolvent required is readily determined by carrying out the polymerization using varying amounts of cosolvent. The minimum quantity of cosolvent necessary is that amount required to maintain a homogeneous system; that is to prevent precipitation of polymer during polymerization.

The term "cosolvent" as used in the specification and claims means the inert solvent which, together with the monomer feed, comprises the vehicle for the reaction. The cosolvent and monomers must be mutually soluble and the blend of monomer plus cosolvent must be a solvent for the copolymer at the polymerization temperature. The term "inert" means that the cosolvent will not react with the catalyst or otherwise enter into the polymerization reaction. The cosolvent must not contain substituents in its molecule which will interfere with the polymerization reaction. Aliphatic hydrocarbons are suitable cosolvents. The preferred cosolvents are paraffinic hydrocarbons, and carbon disulfide. Preferably, the paraffinic hydrocarbon solvent is a $C_5$–$C_{10}$ hydrocarbon, more preferably a $C_5$ to $C_8$ hydrocarbon. Illustrative examples of the hydrocarbon solvents are pentane, isopentane, methyl pentane, hexane, cyclohexane, methylcyclohexane, dimethylcyclohexane, heptane, isooctane, 1,2,3,3-tetramethyl hexane, tetramethyl cyclohexane, etc. Generally any paraffin, whether normal, branched or cyclic which is a liquid under polymerization conditions, may be used. The term "paraffin" as used in the specification and claims includes normal paraffins, cycloparaffins and branched paraffins.

It will be evident to those skilled in the art that since the monomers act as part of the solvent system for the homopolymer, the conversion level of the polymerization must not be so great as to result in precipitation of the copolymer as a result of depletion of solvent. Preferably the conversion level is about 2 to about 20 percent; more preferably about 3 to 15 percent; most preferably about 5 to about 13 percent, e.g., 10 percent.

In the practice of this invention the catalyst must be an aluminum halide. Furthermore, the catalyst must be in the form of a homogeneous solution or submicron dispersion of catalyst particles, e.g., colloidal dispersion. Therefore, the catalyst must be dispersed or dissolved in a suitable catalyst solvent or mixture of solvents. The catalyst solvent must be a polar solvent. Illustrative examples of suitable aluminum halides are $AlCl_3$ and $AlBr_3$. The preferred catalyst is aluminum chloride. The term "polar solvent" as used in the specification and claims means non-aromatic, organic solvents having a dielectric constant at 25°C. of at least 4, preferably about 4 to about 20, more preferably about 6 to about 17; most preferably about 9 to about 13. These polar solvents, however, must not contain sulfur, oxygen, phosphorus or nitrogen in the molecule since compounds containing these elements will react with or otherwise deactivate the catalyst.

The preferred polar solvents are inert halogenated aliphatic hydrocarbons; more preferably halogenated paraffinic hydrocarbons and vinyl or vinylidene halides; most preferably primary or secondary chlorinated paraffinic hydrocarbons. The halogenated hydrocarbon is preferably a $C_1$–$C_5$ paraffin hydrocarbon; more preferably a $C_1$–$C_2$ paraffin. The ratio of carbon atoms to halogen atoms in the polar solvent is preferably 5 or less. Preferably the halogen is chlorine.

Illustrative examples of these polar organic solvents are methylchloride, ethyl chloride, propyl chloride, methyl bromide, ethyl bromide, chloroform, methylene chloride, vinyl chloride, vinylidene chloride, dichloroethylene, etc. Preferably, the polar solvent is methyl chloride or ethyl chloride. Generally any inert halogenated organic compound which is normally liquid under polymerization conditions and has a dielectric constant of at least 4.0 may be used.

It is essential in carrying out this invention that the aluminum halide catalyst be in solution in the polar organic solvent prior to introduction of the catalyst to reaction medium. Combining the polar organic solvent with the reaction medium and thereafter adding the aluminum halide catalyst thereto will not result in the production of the high $\overline{Mn}$, high unsaturation polymers of this invention.

Use of the term "solution" with reference to the polar organic solvent/aluminum halide systems is intended to include both true solutions and colloidal dispersions since they may exist concurrently in the same system.

The aluminum halide/polar solvent catalyst preferably comprises about 0.01 to about 2 weight percent aluminum halide; more preferably about 0.05 to about 1; most preferably 0.1 to about 0.8.

In carrying out the polymerization of this invention those skilled in the art will be aware that only catalytic amounts of catalyst solution are required. Preferably the volume ratio of monomer plus cosolvent to catalyst solution is about 100/1 to about 9/1; more preferably about 80/1 to about 10/1; most preferably about 50/1 to about 20/1.

In practicing the process of this invention, it is essential that the polymerization be carried out in the homogeneous phase without the precipitation of polymer. Conventional slurry processes are inapplicable for the preparation of the high unsaturation polymers of this invention since by their nature they result in polymer precipitation with gelation of the polymer as a consequence.

The amount of cosolvent required in order to maintain the polymerization reactants and product in solution throughout the polymerization is a function of the multi-olefin selected for polymerization and its concentration in the monomer feed. The polymerization temperature at which precipitation of polymer will occur is itself a function of the amount of and type of cosolvent and the particular multi-olefin being copolymerized.

The term "critical homogeneous polymerization temperature" as used in the specification and claims means that polymerization temperature below which precipitation of polymer will occur when no cosolvent is included in the reaction mixture, i.e., the only solvent for the reactants and product being the monomer feed.

Referring now to FIG. I, the volume percent of multi-olefin (isoprene) in the monomer blend (B No.) is plotted as a function of the polymerization temperature below which precipitation of polymer and as a consequence gelation occurs in the absence of cosolvent. The curve represents the critical homogeneous polymerization temperatures for isobutylene-isoprene systems.

The process of this invention incorporates the isobutylene and isoprene into the copolymer in substantially the same ratio as it exists in the feed. For example, where an isobutylene-isoprene monomers feed comprises 15 volume percent isoprene the polymer formed therefrom comprises about 12.5 mole percent unsaturation. Characterization of polymers prepared by bulk polymerization, i.e., without cosolvent, shows that the polymers formed are low in number average molecular weight ($\overline{Mn}$). In order to increase $\overline{Mn}$, the lowering of polymerization temperature is an obvious expedient. However, in the absence of cosolvent, the result if not greater $\overline{Mn}$ but gelation.

With reference to blend of monomers or blend of monomers from which polymers have been made, the term "B No." means the volume percent isoprene in the monomer blend at the polymerization temperature. For example, a "B15" polymer is a polymer prepared from an isobutylene-isoprene blend comprising 15 volume percent isoprene. As has been indicated earlier the mole percent unsaturation is generally substantially the same as the B No.

The terms "unsaturation" or "multiolefin content" as used with reference to the amount of multiolefin enchainment in the product are equivalent terms. The composition of the copolymer (mole percent unsaturation = mole percent diene content) is substantially the same as the composition of the feed for acyclic dienes. However, where the diene is a cyclic diene it is present in considerably higher amounts, e.g., 3 to 4 times, in the copolymer as in the feed.

The problem of gelation is obviated by the addition of a cosolvent which permits the lowering of polymerization temperature below the critical homogeneous polymerization temperature. It has been found that polymerization temperature of at least −100°C. is necessary in order to achieve $\overline{M}n$ values of at least 120,000. At least 5 volume percent inert solvent based on the monomer feed is necessary in order to carry out the polymerization in solution at these low temperatures.

The polymers of this invention have $\overline{M}n$ of at least 120,000. Preferably the $\overline{M}n$ is at least 130,000; more preferably at least 140,000; most preferably at least 150,000, e.g., 160,000.

In practicing the process of this invention, one skilled in the art may proceed as follows in order to determine the preferred reaction conditions.

First, a convenient polymerization temperature below −100°C. is selected. Preferably the temperature is below −110°C., e.g., −120°C. Next the desired feed composition, i.e. monomers and ratio of isoolefin to multiolefin and the cosolvent to be used are selected. Polymerization reactions are carried out using successively greater amounts of solvent. The initial polymerization reaction is carried out using 5 volume percent based on the total of monomer plus solvent of the cosolvent since lesser amounts will be inadequate. In each successive run an additional 5 volume percent is added. The procedure is continued until the reaction medium remains clear throughout the reaction. Turbidity is indicative of precipitation of polymer which leads to gelation.

The polymer formed is characterized for $\overline{M}n$ and mole percent unsaturation. Where a higher $\overline{M}n$ is desired it may be achieved by either lowering the polymerization temperature or where possible using slightly less solvent than determined by the above method, e.g., 1–2 vol percent less, provided that turbidity does not occur. Reduction of polymerization temperature may result in a greater cosolvent requirement. Hence, the aforegoing procedure of adding additional solvent to the reaction medium must be continued until the reaction medium is again clear throughout the polymerization.

Where the mole percent unsaturation is to be adjusted somewhat more or less of the multiolefin is used depending on whether a slightly higher or lower unsaturation is desired. Change in feed composition may require readjusting the cosolvent requirement. Generally, increasing the multiolefin content of the monomer feed decreases the cosolvent requirements of the system.

The optimum reaction conditions are those which give the maximum $\overline{M}n$ at the highest temperature for the desired unsaturation level. The smaller the quantity of cosolvent used the greater the $\overline{M}n$. Economic considerations dictate the use of the warmest temperature practical for polymerization. Use of lower temperatures will necessitate the use of greater amounts of cosolvent. At temperatures below −140°C. the cosolvent requirements for homogeneous polymerization are so great that further reductions in temperature result in lower rather than higher $\overline{M}n$ as a result of the larger quantities of solvent required.

Where it is anticipated that products of different mole percent unsaturation are to be produced it may be advantageous to determine the "critical homogeneous polymerization temperature" curve for the isoolefin multiolefin system to be used.

In utilizing this approach, the desired isobutylene-multiolefin polymer to be prepared first is selected. A "critical homogeneous polymerization temperature" curve similar to FIG. 1 for the multiolefin selected is prepared using a polar solvent-catalyst system suitable for use in this invention.

In conducting the necessary polymerizations, the reactions are carried out in bulk without using inert diluent. For each different multiolefin content monomer feed, polymerizations are carried out at progressively lower temperatures until the critical homogeneous polymerization temperature for the feed composition is determined. The polymerization is repeated for different feed compositions and the data obtained are the critical homogeneous polymerization temperatures as a function of multiolefin content of the feed. A plot of these data gives the critical homogeneous polymerization temperature curve analysis to that of FIG. 1. The polymer formed is analyzed for multiolefin content and a determination is made of the correlation mole percent unsaturation in the polymer and volume percent multiolefin in the feed.

The polymer formed in bulk polymerization is unsuitable for commercial use since it has a $\overline{M}n$ of less than 120,000. In order to increase the $\overline{M}n$ of the polymer it is necessary to carry out the polymerization at lower temperatures, e.g., less than −100°C., which requires the addition of cosolvent to prevent precipitation of polymer during polymerization.

The quantity of cosolvent used should be kept to a minimum since excess cosolvent results in the lowering of $\overline{M}n$. In determining the amount of solvent to be used the monomer feed composition is determined. A convenient polymerization temperature below −100°C. is selected. As a first approximation the volume percent of inert solvent to be added to the monomer feed is the difference between the multiolefin content of the feed and the multiolefin content of a monomer feed having a critical homogeneous solution temperature which is the same as the polymerization temperature to be used. For example, an isobutylene copolymer is to be prepared using isoprene as the multiolefin. The monomer feed is to contain 15 percent multiolefin and polymerization is to be carried out at −105°C. Referring to FIG. 1, the isobutylene-isoprene composition having a critical homogeneous solution temperature of −105°C. contains 35 volume percent isoprene. Hence, as a first approximation, the volume percent cosolvent to be used in the polymerization of a feed containing 15 volume percent isoprene is 35 minus 15 or 20 volume percent cosolvent. The $\overline{M}n$ of the polymer formed may be increased by either reducing the polymerization temperature or reducing the amount of solvent, provided, however, neither the temperature nor solvent may be reduced to the level where precipitation of polymer occurs.

Alternately, the minimum cosolvent requirements for a particular isoolefin-multiolefin may be determined by carrying out the polymerization at the critical homogeneous polymerization temperature for the isoolefin-multiolefin feed composition, terminating the polymerization by destroying the catalyst and, with constant stirring, lowering the temperature of the systems to the desired polymerization temperature. The polymer which, of course, is by definition insoluble below the critical homogeneous polymerization temperature will precipitate out and the system will appear turbid. The polymer will not be gelled, however, since polymerization was terminated prior to precipitation. The cosolvent selected is then added in incremental amounts until the turbidity disappears. The quantity of solvent so added is a good approximation of the minimum solvent requirements for a given isoolefin-multiolefin feed to be polymerized at a given temperature.

The term "solution polymerization" as used in the specification and claims means a polymerization carried out so that the polymer product remains dissolved throughout the reaction.

Where the diene to be polymerized is isoprene, the preferred cosolvents are heptane, hexane or methylcyclohexane utilized at about 5 to about 30 volume percent; more preferably at about 10 to about 25 volume percent, e.g., 10 volume percent. Where the diene is cyclopentadiene the preferred cosolvents are methylcyclohexane (MCH) and $CS_2$ utilized at about 15 to about 30 volume percent, e.g., 20 to about 25 volume percent.

The products of this invention offer a number of important advantages over the commercially available butyl rubbers. In addition, to possessing superior cold flow and green strength properties while retaining the low air permeability and mechanical damping characteristics of conventional low unsaturation isoolefin copolymers, the products of this invention offer greater versatility in vulcanization techniques. Furthermore while the vulcanization of conventional isoolefin-multiolefin copolymers requires the use of ultra-accelerator type cures, e.g., thiuram (Tuads) or dithiocarbamates (Tellurac), the products of this invention may be vulcanized using the thiazole, e.g., mercaptobenzothiazole, type cures currently used in the vulcanization of general purpose rubbers, e.g., natural rubber, SBR, polybutadiene, etc. Because of certain factors of which such a premature vulcanization (scorch) is a prime example, modern practice has tended towards the use of a special class of thiazoles called delayed action accelerators. These delayed action accelerators permit the processing of the compounded rubber (including vulcanizing agents) at the vulcanization temperature for a predetermined period of time before vulcanization commences. Such cure techniques are not possible with conventional isoolefin copolymers. The delayed action accelerators are, however, used advantageously in the vulcanization of the isoolefin copolymers of this invention.

The delayed action accelerators suitable for use in vulcanizing the products of this invention include the benzathiole sulfenamides having the general formula

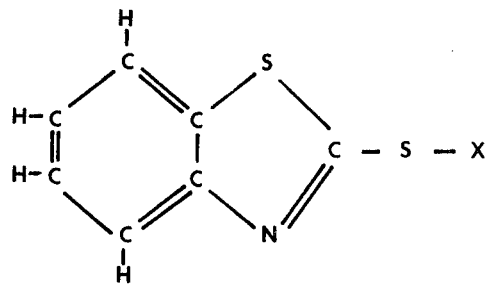

wherein X is an amino group. The amino group is mono or di organosubstituted and may be cyclic including heterocyclic. For example, X may be

or $-N-R_2$ where $R_1$ is H or R and R is organo or cycloorgano. $R_2$ is a divalent organo radical. Illustrative examples of X are cyclohexylamino, tertiary butyl amino, diisopropyl amino, dicyclohexyl amino, pentamethyleneamino, morpholino, 2-(2,6-dimethyl morpholino), etc. Specific illustrative examples of these sulfenamides are N,N-diethylbenzothiazole-2-sulfenamide, N-N-diisopropyl benzothiazole-2-sulfenamide, N-tertiary butyl benzothiazole-2-sulfenamide, N-cyclohexyl benzothiazole-2-sulfenamide, N,N-dicyclohexyl benzothiazol-2-sulfenamide, 2-(morpholino) benzothiazole sulfenamide, 2-(2,6-dimethyl morpholino) benzothiazole sulfenamide, 2-piperdinyl benzothiazole sulfenamide. In general, any benzathiazole sulfenamide may be used as a delayed action accelerator for the sulfur vulcanization of the polymers of this invention.

The delayed action accelerator is incorporated into the vulcanizable polymer composition at preferably about 0.1 to about 5 wt. percent based on the polymer; more preferably about 0.25 to about 3.5; most preferably about 0.5 to about 3.0 wt. percent, e.g., 0.5 to about 2.5 wt. percent.

It is, of course, obvious to those skilled in the art that the delayed action cures are sulfur cures and sulfur must be incorporated into the polymer blend either as elemental sulfur or as nonelemental sulfur. Suitable nonelemental sulfur is in the form of those compounds which will release sulfur to the polymer under vulcanization conditions. For a description of these nonelemental sulfur compounds, generally, see Vulcanization of Elastomers, Ch. 4, J. C. Ambelang, Reinhold, New York, 1964 incorporated herein by reference. Illustrative examples of these nonelemental sulfur compounds are dimorpholvinyl disulfide and alkyl phenol disulfides. The term "sulfur donor" as used hereinafter in the specification and claims means elemental sulfur as well as the aforementioned nonelemental sulfur compounds. The quantity of sulfur donor required for vulcanization is well known to those skilled in the art. Where the sulfur donor is elemental sulfur, it is incorporated into the polymer at about 0.1 to about 5 wt. percent based on the polymer; more preferably about 0.25 to about 3.5 wt. percent; most preferably about 0.5 to about 3.0 wt. percent, e.g., 0.5 to about 2.5 wt. percent. Where the sulfur donor is a nonelemental sulfur compound, it is incorporated at a weight percent of about three times that required for elemental sulfur. The term "nonelemental sulfur compounds" means organic compounds containing sulfur and capable of donating the sulfur to a vulcanization reaction, e.g., disulfides and polysulfides.

The delayed action accelerators may be modified by retarders and activators which will respectively retard or activate the sulfur vulcanization. The addition of the retarder will further delay the time at which vulcanization occurs while the activator will cause vulcanization to occur sooner, e.g., shorter delay time.

The retarders suitable for use in the practice of this invention include organic compounds having a pKa of about 2 to less than 7; preferably about 3 to about 6.5; more preferably about 4 to about 6, e.g., 5. The term pKa is the dissociation constant as measured in aprotic solvents, see for example Acid-Base Behavior in Aprotic Solvents NBS Monograph 105, August 1968.

The activators suitable for use in the practice of this invention are metallic oxides, hydroxides and alkoxides of Group Ia and Group IIa metals of the Periodic Table of the Elements and organic compounds having a pKa of about 8 to about 14; preferably about 9 to about 12; more preferably about 9.5 to about 11, e.g., 10.

Illustrative examples of retarders are N-nitroso diphenylamine, N-cyclohexyl thiophthalimide, phthalic anhydride, salicylic acid, benzoic acid, etc. Generally, the preferred retarders are nitroso compounds, phthalimides, anhydrides and acids.

Illustrative examples of activators are MgO, diphenylquanidine, hexane-1-amine, 1,6-hexane diamine, sodium methoxide, etc. The preferred activators are quanidines and amines.

The retarders and activators are preferably incorporated into the polymer at about 0.1 to about 5 wt. percent; more preferably about 0.25 to about 3.5 wt. percent; most preferably about 0.5 to about 3.0 wt. percent, e.g., 0.5 to about 2.5 wt. percent.

The vulcanizing agents, accelerators, retarders and activators which may be used with the copolymers of this invention may be incorporated into the copolymers of this invention by conventional blending techniques, and the method of blending does not form a part of this invention. For example, Banbury mixers may be used to prepare the blends of copolymer, vulcanizing agents, retarders, activators and accelerators.

Copolymers of isoolefins and cyclodienes, e.g., isobutylene and cyclopentadiene possess markedly improved resistance to degradation by ozone over the acyclic diene copolymers. Although it has been postulated that such copolymers would have such improved properties as a result of having the unsaturation located in a side chain rather than in the backbone, it has heretofore not been possible to prepare substantially gel-free isoolefin-cyclodiene copolymers of high number average molecular weight even at low levels of unsaturation.

Utilizing the process of this invention, it is now possible to prepare such cyclodiene copolymers having as little as 0.5 mole percent unsaturation and as high as 40 mole percent unsaturation. Preferably, the polymers contain about 3 to about 35 percent; more preferably about 6 to about 30 mole percent unsaturation; most preferably 12 to about 30 mole percent, e.g., 16 to about 28 mole percent. As a result of the relatively lower reactivity of the unsaturation as compared to the acyclic diene copolymers, copolymers having incorporated therein about 2–4 mole percent cyclic diene are about as reactive as butyl rubber having an acyclic diene content of about 0.5 to about 1.5 mole percent and require ultra acceleration for sulfur vulcanization. By contrast the higher unsaturation copolymers, e.g., at least 5 mole percent, preferably at least 8 mole percent, may be sulfur vulcanized using the delayed action accelerator cure systems described above.

In general, the polymers of this invention must not contain more than 40 mole percent unsaturation. Above 40 percent unsaturation, polymers prepared from acyclic multiolefins are intractable and unstable, e.g., gel on standing. Where the multiolefin is a cyclic multiolefin above 40 mole percent unsaturation, the glass transition temperature of the polymer is too high. As a result, the polymers have poor low temperature characteristics. Preferably, the polymers of this invention have about 5 to about 35 mole percent unsaturation; more preferably about 8 to about 30 mole percent; most preferably about 10 to about 25 mole percent; e.g., 16 to about 25 mole percent.

As has been pointed out earlier the highly unsaturated polymers of this invention are substantially as impermeable to air as are commercial low unsaturates, e.g., 1.5 mole percent butyl rubbers. Surprisingly, isoolefin copolymers of CPD or terpolymers of an isoolefin-CPD and an acyclic diene are less permeable to air at the higher unsaturation levels than is the low unsaturation butyl rubber of commerce.

Thus, the process of this invention permits the preparation of isoolefin copolymers, heretofore unattainable, which surprisingly retain all the advantageous characteristics of conventional low unsaturation butyl rubber while exhibiting improved vulcanization characteristics and in some cases, e.g., CPD copolymers, improved ozone resistance and air impermeability.

The term "substantially gel free" as used in the specification and claims means copolymers of this invention containing less than 2 percent gel; more preferably less than 1 percent gel; most preferably less than ½ percent gel.

The advantages of this invention may be more readily appreciated by reference to the following examples.

EXAMPLE 1

Monomer mixes comprising varying amounts of isoprene in isobutylene were polymerized using as the catalyst a solution of $AlCl_3$ in methylchloride (about 0.5 g. $AlCl_3$/100 ml. of $CH_3Cl$). The polymer was precipitated from boiling methanol saturated with PBN (N-phenyl-$\beta$-naphthylamine).

Polymerization was carried out over a range of temperatures until that temperature at which polymer would fall out of solution was determined for a given isoprene/isobutylene feed mixture.

The results are shown in FIG. 1. The critical temperature below which polymerization is no longer homogeneous (i.e. single phase solution) is shown as a function of isoprene content (B No.) of the isoprene/isobutylene feed. In the area below the curve precipitation of polymer with subsequent gelation occurs. Above the curve polymerization is homogeneous and a soluble gel-free polymer is prepared.

The temperature for a given isoprene content of the monomer feed at which precipitation occurs is termed the "critical homogeneous polymerization temperature" (CHPT) for the bulk polymerization (no inert cosolvent) of isobutylene-isoprene feeds. The CHPT is not a rigorously defined value but rather an operational quantity defining the lowest temperature at which gel-free polymerization can be carried out in bulk to significant conversion levels, e.g., >2 percent conversion.

EXAMPLE 2

Charges of monomer feed comprising 30 volume percent isoprene and 70 volume percent isobutylene were polymerized at the CHPT for that composition (−100°C.) and at −120°C. The polymerization was initiated with $AlCl_3$ as the catalyst dissolved in methyl chloride (Ca 0.5 g. $AlCl_3$/100 ml. $CH_3Cl$). The reaction was terminated ten (10) minutes after the introduction of catalyst using a few drops of a 10 percent solution of sodium methoxide in methanol saturated with PBN. The polymer was precipitated from methanol and dried in a vacuum oven at 50°C. The gel content of the polymers was determined by redissolving the polymers in toluene and separating the soluble polymer from insoluble gel. The results are shown in Table I.

TABLE I

BULK POLYMERIZATION OF ISOBUTYLENE-ISOPRENE FEED CONTAINING 30% ISOPRENE

| Polymerization Temp. °C | Monomer Feed (ml) | Catalyst Solution (ml) | Polymer Yield (g) | Conversion (%) | Gel Content (%) |
|---|---|---|---|---|---|
| −100°C | 26.7 | 2 | 0.832 | 4.2 | 0 |
| −100°C | 26.7 | 2 | 0.742 | 3.7 | 0 |
| −100°C | 106.8 | 8 | 5.195 | 6.5 | 0 |
| −120°C | 26.7 | 2 | 0.522 | — | 88.0 |
| −120°C | 26.7 | 2 | 0.558 | — | 83.0 |
| −120°C | 26.7 | 0.5 | 0.076 | — | 77.6 |

It is evident that carrying out the polymerization substantially below the critical homogeneous polymerization temperature results in catastrophic gel formation.

EXAMPLE 3

The experiment of Example 2 was repeated at −105°C. and −110°C. At −110°C. the polymer formed was highly gelled. The results at −105°C. are shown in Table II.

TABLE II

BULK POLYMERIZATION OF A 30 VOLUME % ISOPRENE FEED AT −100°C.

| Reaction Time | Polymer Yield (g) | Conversion % | Gel Content (%) |
|---|---|---|---|
| 5 | 18.5 | 2.3 | 1.6 |
| 10 | 21.4 | 2.7 | 1.7 |
| 15 | 26.2 | 3.3 | 8.7 |
| 20 | 32.9 | 4.1 | 19.5 |
| 30 | 41.5 | 5.2 | 36.5 |

It is apparent that at low conversions at a temperature slightly below the CHPT low gel content polymer may be formed. At higher conversions, however, gel content increases to unacceptable levels.

EXAMPLE 4

The polymerization of Example 2 was repeated at −100°C. using 26.7 ml. of monomer and varying amounts of catalyst solution (0.5–2.0 ml). After deactivating the catalyst, the unreacted monomers and polymer were cooled to −120°C. Precipitation of polymer resulted. Warming of the reactant polymer system to −100°C. redissolved the polymer. Hence, the polymer formed was not gelled. Therefore, it is demonstrated that precipitation of the polymer is a result of reduced temperature and that gel formation only occurs in the presence of active catalyst.

It is apparent, therefore, that precipitation of polymer during polymerization is not a result of gelation but that gelation is the result of precipitation of polymer in the presence of active catalyst. Hence, it is essential to carry out the process of this invention in a homogeneous system to avoid gelation.

EXAMPLE 5

The polymerization reactions of Example 1 were repeated at the CHPT for various feed compositions and the molecular weights of the product determined. Number average molecular weights ($\overline{M}n$) were determined by membrane osmometry and viscosity average molecular weights were determined in toluene at 25°C.

The results are shown in Table IV.

TABLE IV

$\overline{M}n$ AND $\overline{M}v$ FOR BULK POLYMERIZATION POLYMERS AT CHPT

| % Isoprene | Temperature (°C.) | $\overline{M}n \times 10^{-3}$ | $\overline{M}v \times 10^{-3}$ |
|---|---|---|---|
| 15 | −85 | — | 135 |
| 15 | −85 | — | 130 |
| 15 | −85 | — | 134 |
| 15 | −85 | — | 134 |
| 30 | −100 | 96 | 213 |
| 30 | −100 | 90 | 267 |
| 30 | −100 | 101 | 215 |
| 30 | −100 | 103 | 239 |
| 60 | −130 | 71 | 271 |

It is apparent that in a bulk polymerization at the lowest possible polymerization temperature yielding substantially gel-free products (CHPT) high number average molecular weight polymers ($\overline{M}n$ 120,000) cannot be prepared.

The polymers so formed, although gel-free and high in unsaturation, do not have a number average molecular weight ($\overline{M}n$) of at least 120,000.

In order to produce higher molecular weight gel-free products it is necessary to reduce the polymerization temperature while at the same time maintaining the reactants and polymer in solution. This is accomplished by using at least five to about 40 weight percent cosolvent.

EXAMPLE 6

The experiments of Example 5 were repeated using various cosolvents and varying the precent isoprene in the feed from about 5 to about 38 vol. percent. The results are shown in Table V. Use of a cosolvent permits lower polymerization temperature and gives polymers having number average molecular weights of at least 120,000, whereas, for example, a monomer feed containing 15 vol. percent isoprene had a CHPT of −85°C. The addition of inert solvent permits the polymerization to be carried out at −120° to −130°C. with significant increases in $\overline{M}n$ values, i.e., at least 120,000.

For a given isoprene/isobutylene ratio, the amount of solvent used will affect molecular weight.

The polymers formed were substantially gel free (e.g., less than 1.0 percent). Although prior art butyl rubbers are said to contain unsaturation as essentially 1,4-enchainment, the products of this invention contain significant quantities of 1,2- and 3,4-enchainment.

TABLE V

Isobutylene-Isoprene Copolymerizations Using Cosolvents (−120°C.)

| Run No. | Feed (Volume % Isoprene) | Solvent | Vol.%[a] | $\overline{M}n \times 10^{-3}$ | $[\eta]^c$ | $\overline{M}v \times 10^{-3}$ | % Gel Content | Mole % Unsat. (Infrared) |
|---|---|---|---|---|---|---|---|---|
| 1 | 10 | n-heptane | 20 | 295 | — | — | 0.98 | 6.0 |
| 2 | 15 | $CS_2$ | 20 | 172 | 1.340 | 412 | 0.38 | 14.4[d] |
| 3 | 15 | n-heptane | 20 | 187 | 1.137 | 318.8 | ~0 | 12.0 |
| 4 | 15 | methylcyclo-hexane | 10 | 197 | 1.288 | 384.6 | 0.26 | — |
| 5 | 30 | $CS_2$ | 5 | 162 | 1.342 | 315.2 | 0.56 | — |
| 6 | 30 | cyclohexane | 7.5 | 198 | — | — | 0.52 | — |
| 7 | 30 | cyclohexane | 20 | 172 | 1.356 | 320 | 0.69 | — |
| 8 | 30 | n-heptane | 10 | 182 | 1.386 | 331 | 0.92 | 31.8 |
| 9 | 30 | n-pentane | 7.5 | 160 | 1.056 | 220 | 0.71 | — |
| 10 | 38 | n-heptane | 5 | 157 | 1.397 | 281 | 0.39 | 42.2 |
| 11 | 15[b] | $CS_2$ | 20 | 181 | 1.455 | 355 | 0.37 | 16.4 |

[a]Uncorrected for volume decrease on cooling.
[b]−130°C.
[c]0.1% in Toluene at 25°C.
[d]NMR analysis

EXAMPLE 7

The minimum inert cosolvent requirement was determined for various cosolvents and isoprene contents. The approximate cosolvent required was estimated from the extrapolated curve (broken line) of FIG. 1. The comparison of estimated and actual solvent requirements is shown in Table VI.

TABLE VI

Minimum Inert Cosolvent Requirements for Isoprene - Isobutylene Systems

| Isoprene Content (Vol %) | Polymerization Temperature (°C.) | Estimated Solvent Requirement (Vol %) | Actual Minimum Cosolvent Required (Vol %) | | | |
|---|---|---|---|---|---|---|
| | | | Iso-Pentane | n-Heptane | Methyl-cyclo-hexane | $CS_2$ |
| 15 | −120 | 25 | 25 | 15 | 10 | 10 |
| 15 | −130 | 30 | — | — | 20 | 20 |
| 30 | −120 | 10 | — | 10 | — | 5 |
| 30 | −130 | 15 | — | — | — | 10 |

It is apparent that minimum cosolvent requirements for a homogeneous polymerization are a function of both polymerization temperature and the solvent selected. The values estimated by the manner described earlier from FIG. 1 are good first approximations of the solvent requirements.

EXAMPLE 8

The effect of cosolvent on $\overline{M}n$ was determined for various isobutylene-isoprene systems. The polymerization was carried out in the manner of Example 1 at −120°C. using $AlCl_3$ in $CH_3Cl$ as the catalyst. The results are shown in Table VII.

TABLE VII

Effect of Cosolvent on Number Average Molecular Weight

| Isoprene Content (Vol %) | Cosolvent Vol % | $\overline{M}n$ | $\overline{M}v$ |
|---|---|---|---|
| 30 | $CS_2$/<5 | Gel | Gel |
| 30 | $CS_2$/5 | 162,000 | — |
| 30 | $CS_2$/7.5 | 150,000 | — |
| 30 | n-$C_5$/7.5[1] | 160,000 | — |
| 30 | n-$C_5$/11 | 129,000 | 208,000 |
| 30 | n-$C_5$/45 | 61,000 | 92,000 |
| 15 | I-$C_5$/25[2] | 166,000 | 315,000 |
| 15 | I-$C_5$/30 | 146,000 | 368,000 |
| 15 | I-$C_5$/40 | 119,000 | 259,000 |
| 15 | I-$C_5$/50 | 87,000 | 157,000 |
| 15 | MCH/10[3] | 197,000 | 384,000 |
| 15 | | | |
| 15 | MCH/25 | 174,000 | 268,000 |
| 15 | MCH/35 | 146,000 | — |
| 15 | MCH/40 | 107,000 | 190,000 |

[1]n-$C_5$ = n-pentane;
[2]I-$C_5$ = isopentane;
[3]MCH = methyl cyclohexane

Hence, it is apparent from these data that at least 5 vol. percent solvent is necessary to avoid gel formation depending on the cosolvent used and that more than 40 vol. percent solvent results in $\overline{M}n$ values of less than 120,000 regardless of the multiolefin content or the solvent selected.

Figure 2:
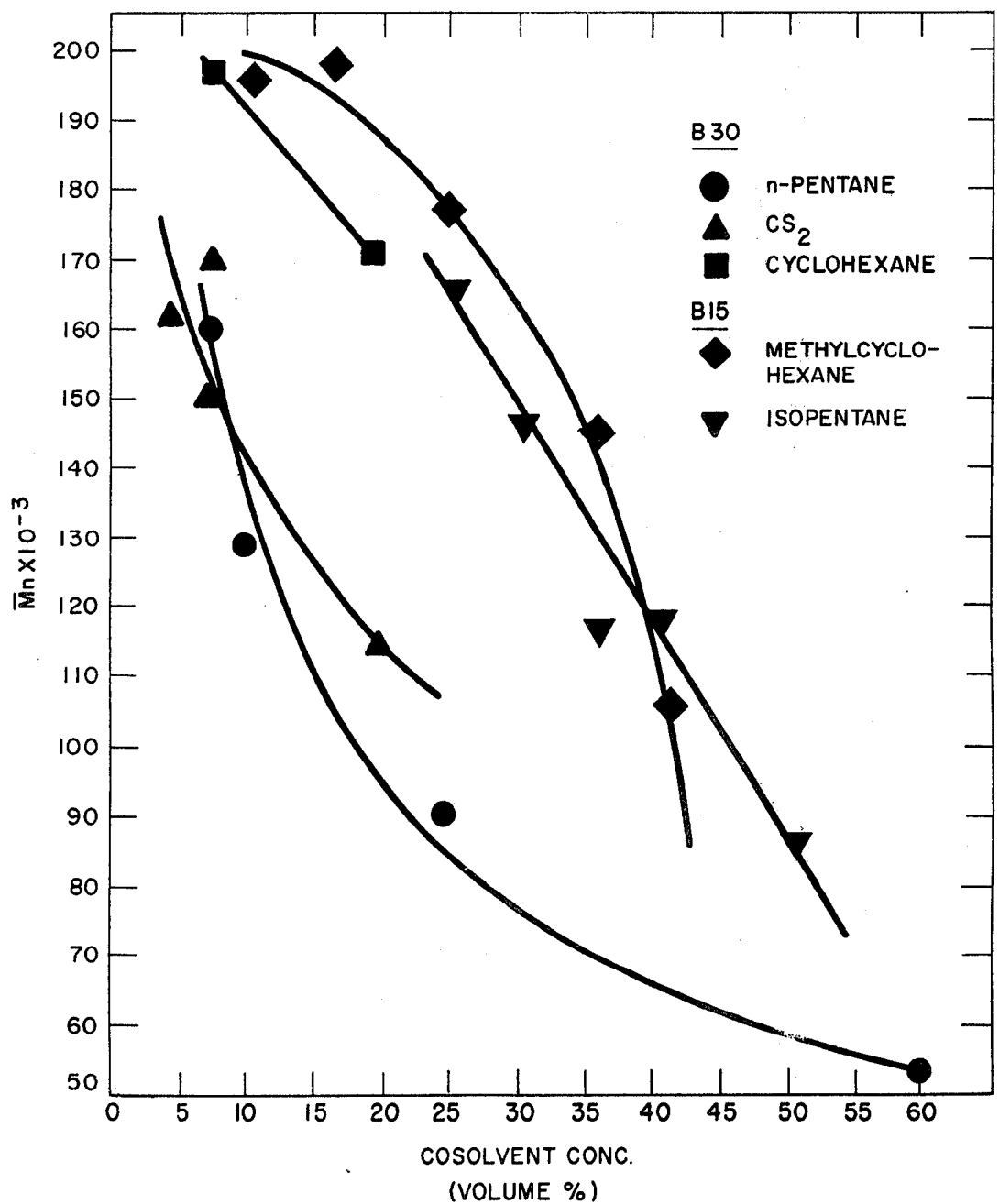
Figure 3:
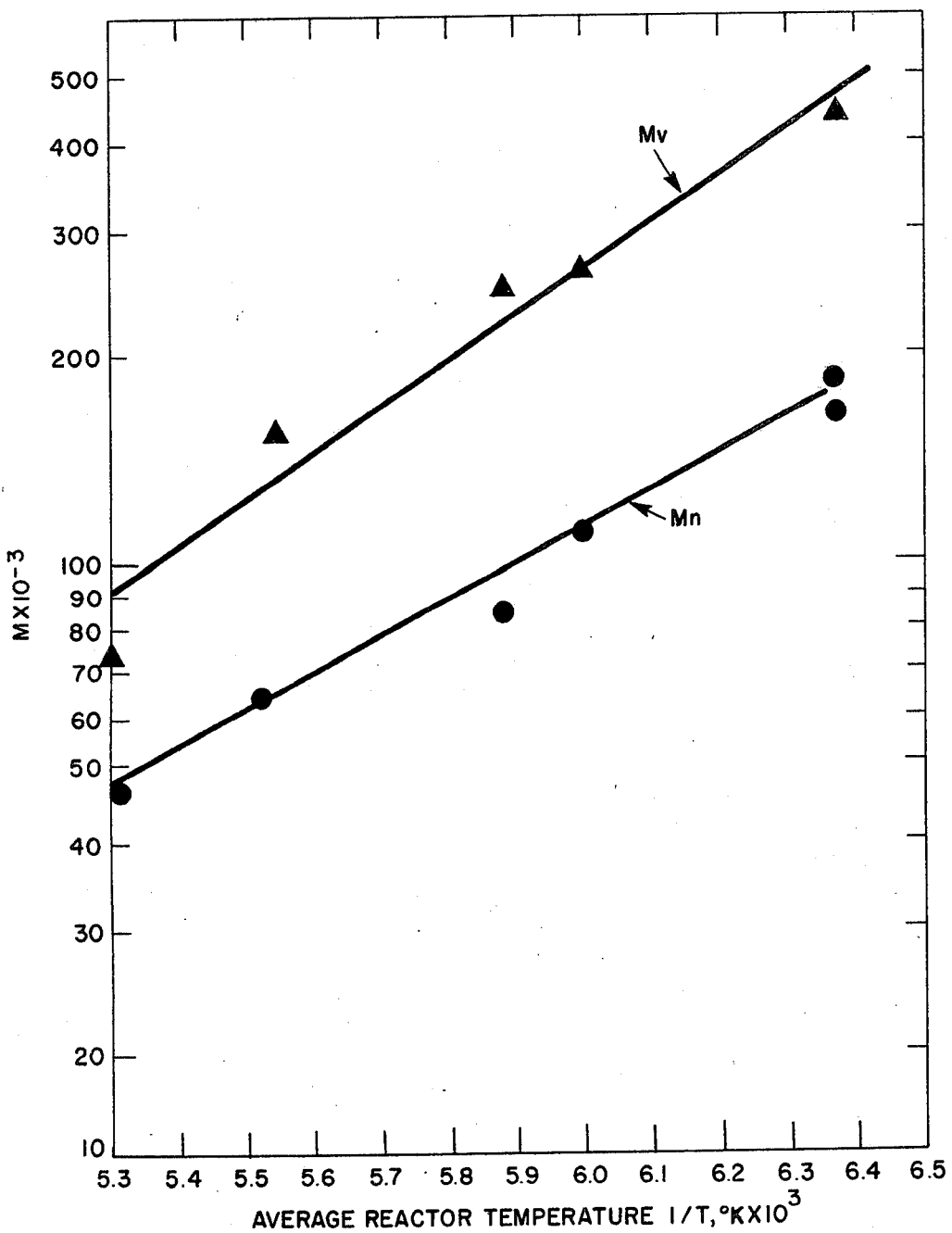
Figure 4:
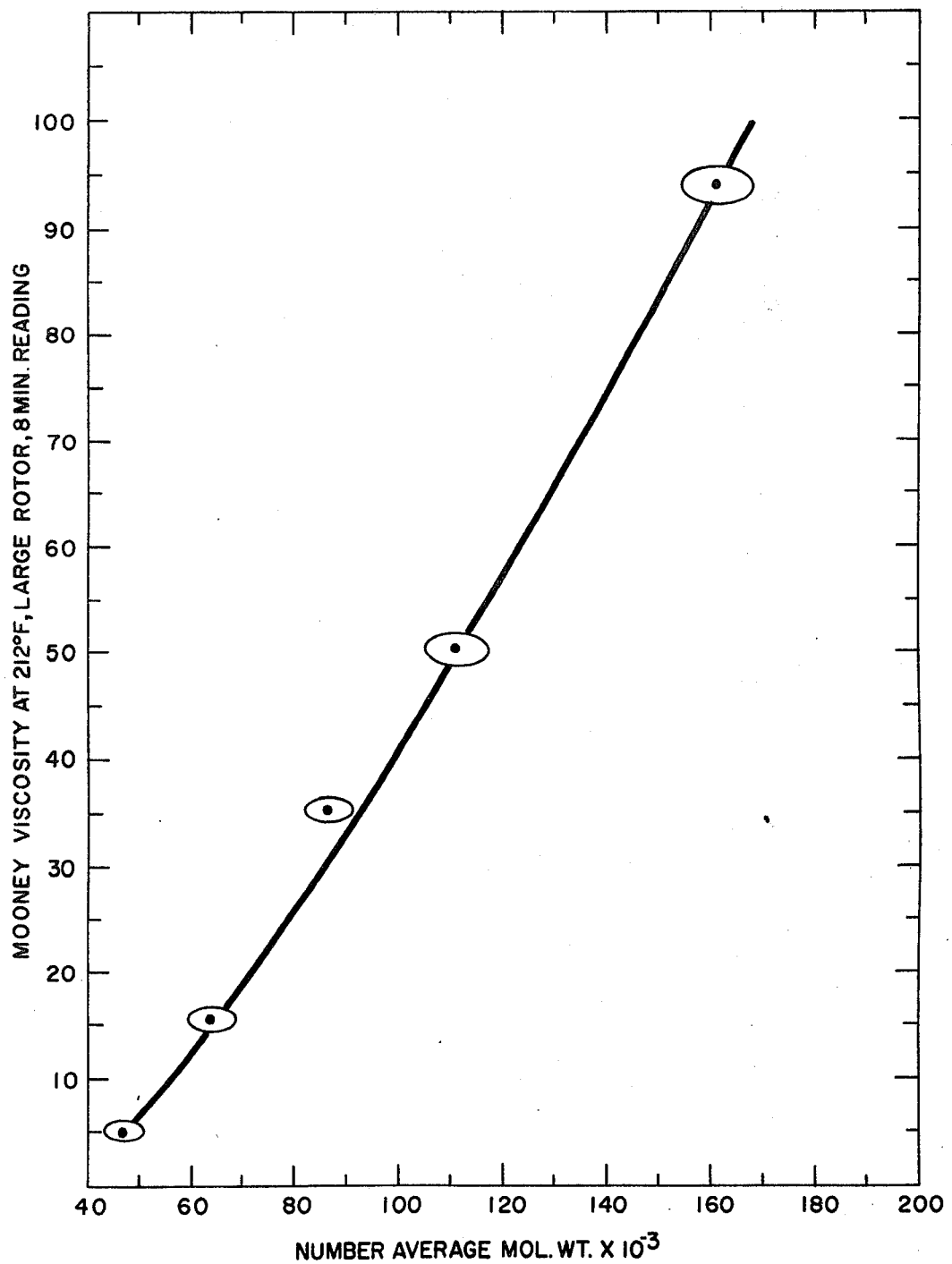
Figure 5:
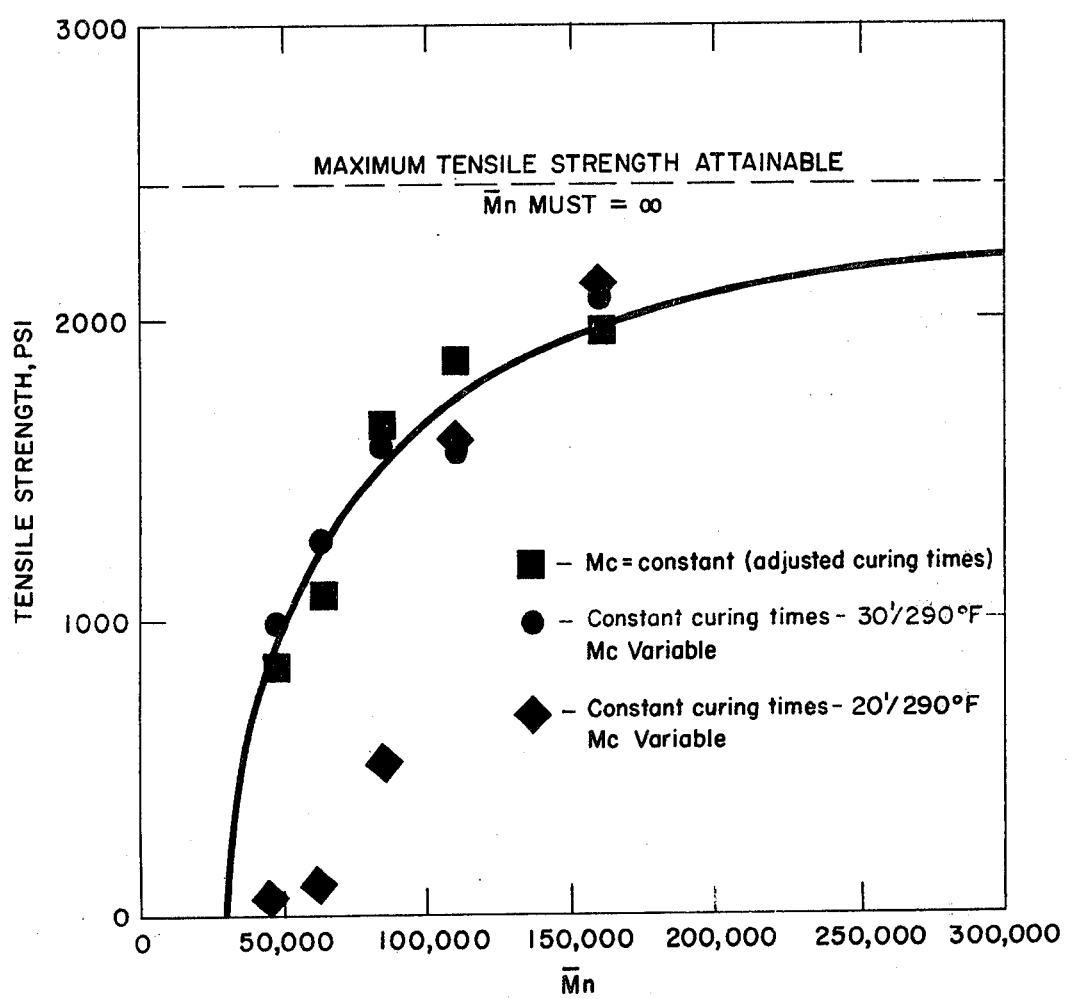

The data is represented graphically in FIG. 2. It is evident that the quantity of solvent used is critical since too little inert cosolvent results in gel formation; too great a quantity of cosolvent results in reduction of $\overline{M}n$ below 120,000.

EXAMPLE 9

Charges of 80/20 monomer/solvent blends wherein the monomer is a 85/15 blend of isobutylene/isoprene and the solvent is n-heptane were polymerized at temperatures of about −85°C. to about −125°C. using $AlCl_3$ dissolved in $CH_3Cl$ as the catalyst solution. The results are represented graphically in FIG. III. It is evident that temperatures below −100°C. must be used to obtain polymers of at least $\overline{M}n$ 120,000. Preferably the polymerization temperature is below −110°C.

EXAMPLE 10

The effect of polar solvent on catalysis was evaluated by carrying out polymerization in the manner of Example I using a B15 isobutylene-isoprene feed in conjunction with 20 volume percent cosolvent based on the monomer plus cosolvent of heptane as cosolvent using polar and non-polar catalyst solvents. The results are tabulated in Table VIII.

A comparison of Runs 1 and 2 show that use of polar catalyst solvent results in high $\bar{M}n$ where non-polar catalyst solvent results in low $\bar{M}n$.

A comparison of Runs 3 and 4 shows that despite the fact the composition of the reaction medium is the same addition of the polar solvent to the cosolvent rather than using it as a catalyst solvent does not give the same high $\bar{M}n$ that is achieved by predissolving the catalyst in polar solvent. Hence, in order to produce

TABLE VIII

EFFECT OF POLAR SOLVENT FOR CATALYSTS ON PRODUCT MOLECULAR WEIGHT

| Run No. | B No. | Catalyst | Catalyst Solvent | Catalyst[1] Concentration | Temp. °C. | $\bar{M}n$ | $\bar{M}v$ | Unsaturation (mole %) |
|---|---|---|---|---|---|---|---|---|
| 1 | 1.5 | AlBr$_3$ | n-heptane | 0.45 | −80 | — | 410,000 | 1.4 |
| 2 | 1.5 | AlBr$_3$ | n-heptane | 0.45 | −120 | — | 581,000 | 1.1 |
| 3 | 15 | AlBr$_3$ | n-heptane | 0.45 | −80 | — | 57,000 | — |
| 4 | 15 | AlBr$_3$ | n-heptane | 0.45 | −120 | 72,000 | 177,000 | 11.6 |
| 5 | 15 | AlBr$_3$ | cyclohexane | 0.58 | −120 | 69,000 | 157,000 | — |
| 6 | 15 | AlBr$_3$ | CH$_3$Cl | 0.34 | −120 | 251,000 | 352,000 | 9.8 |
| 7 | 15 | AlBr$_3$ | CH$_3$Br | 0.48 | −120 | 146,000 | 242,000 | 8.8 |
| 8 | 15 | AlCl$_3$ | CH$_3$Cl | 0.58 | −120 | 182,000 | 438,000 | 12.3 |
| 9 | 30[2] | AlCl$_3$ | CH$_3$Cl | 0.58 | −120 | 148,000 | 317,000 | — |
| 10 | 30[2] | AlBr$_3$ | n-heptane | 0.45 | −120 | — | (3) | — |

[1] Grams catalyst per 100 ml of catalyst solvent;
[2] 10 vol. % cosolvent;
[3] semi-liquid; very low molecular weight.

It is evident from the data of Table VIII that although non-polar catalyst solvents may be used to carry out polymerizations the product is low in number average molecular weight. For example, Run 4 was carried out using heptane as the catalyst solvent. The product had a mole percent unsaturation of 11.6. However, the number average molecular weight was only 72,000. By comparison, when CH$_3$Cl was substituted for heptane as the catalyst solvent (Run 6) the product had a number average molecular weight of 251,000. Hence, in order to produce polymers both high in unsaturation and $\bar{M}n$ it is necessary to use a polar solvent as the catalyst solvent. AlBr$_3$ was used as a catalyst in the comparative studies since AlCl$_3$ is insoluble in non-polar media and results in gelation.

EXAMPLE 11

It is essential that the catalysts of this invention be dissolved in the polar solvent prior to introduction into the reaction medium. To illustrate this point, the experiments of Example 10 were repeated for a B15 feed using AlBr$_3$ as the catalyst and heptane as the cosolvent and CH$_3$Cl or cyclohexane as the catalyst solvents. In order to have fully comparative results where the catalyst solvent was not used to dissolve catalyst, it was added to the cosolvent.

polymers of high $\bar{M}n$, it is essential that the catalyst be predissolved in the polar solvent rather than merely dissolving the catalyst in a solvent and adding the polar solvent to the reaction medium.

EXAMPLE 12

The procedure of Example 10 was employed in an attempt to prepare isobutylene-isoprene copolymers from B15 feeds using Friedel-Crafts catalyst other than aluminum halides. The following catalyst solutions were used for catalysts: BF$_3$ in CH$_3$Cl, TiCl$_4$ in heptane, TiCl$_4$ in CH$_3$Cl, TiCl$_4$/trichloroacetic acid (2:1) in heptane, TiCl$_4$/trichloroacetic acid (2:1) in CH$_3$Cl, SbF$_5$ in CH$_3$Cl and SbF$_5$ in heptane.

The resulting polymers were low in $\bar{M}n$, i.e. less than 120,000. Hence, it is apparent that proper selection of the Friedel-Crafts catalyst namely aluminum halides is essential in the preparation of the high $\bar{M}n$ polymers of this invention.

EXAMPLE 13

An isobutylene-piperylene monomer blend containing 45 percent piperylene was polymerized using AlCl$_3$ in CH$_3$Cl as the catalyst. The inert cosolvent used was heptane (Ca 10 vol percent). The polymerization was carried out at about −120°C.

TABLE IX

EFFECT OF ADDING CATALYST SOLVENT TO COSOLVENT

| Run No. | Catalyst Solvent | ml. Catalyst Solution | Catalyst Solvent in Cosolvent (ml) | Cosolvent Monomer (ml) | $\bar{M}n$ | Unsaturation (mole%) |
|---|---|---|---|---|---|---|
| 1 | methyl chloride | 20 | None | 50/200 | 251,000 | 9.8 |
| 2 | cyclohexane | 20 | None | 50/200 | 69,000 | — |
| 3 | methyl chloride | 25 | cyclohexane (25) | 25/200 | 173,000 | 12.6 |
| 4 | cyclohexane | 25 | methyl chloride (25) | 25/200 | 68,000 | — |

The product formed had a Mn of about 124,000 and comprised 39 mole percent piperylene incorporated therein. Approximately 80 percent of the piperylene was incorporated in the 1,4 addition product isomer. Product analysis indicated less than 0.4 percent gel in the polymer.

EXAMPLE 14

An isobutylene-cyclopentadiene monomer blend comprising about 5 vol. percent cyclopentadiene and about 20 vol. percent $CS_2$ based on total monomer plus $CS_2$ was polymerized in the monomer of Example 13 at a temperature of −120°C. The product had a $\overline{M}n$ of 204,000 and was comprised of 16 mole percent of the cyclopentadiene.

EXAMPLE 15

Example 14 was repeated utilizing methylcyclohexane instead of $CS_2$ as the cosolvent. The product had a $\overline{M}n$ of 194,000. Analysis of the isobutylene copolymer indicated that it was comprised of 16 mole percent cyclopentadiene.

EXAMPLE 16

Example 14 was repeated utilizing a monomer blend comprising 7 percent cyclopentadiene. The product had a $\overline{M}n$ of 163,000. Analysis of the copolymer indicated that it was comprised of 24 mole percent cyclopentadiene.

Various other experiments were carried out in a similar manner. The data is tabulated in Table X.

TABLE X

Isobutylene-Cyclopentadiene Copolymers[1]

| Feed[3] Vol.% CPD in Monomer | Cosolvent Vol % | $\overline{M}n$ | Product Gel Content (wt %) | CPD[2] incorporated (mole %) |
|---|---|---|---|---|
| 3 | $CS_2$/20 | 248,000 | 0.4 | 9.7 |
| 5 | $CS_2$/10 | 265,000 | 0.65 | 16 |
| 5 | $CS_2$/15 | 189,000 | 0.43 | 16 |
| 5 | $CS_2$/20 | 204,000 | 0.43 | 16 |
| 5 | MCH/15 | 187,000 | 0.59 | — |
| 7 | $CS_2$/20 | 163,000 | 0.34 | 24 |
| 10 | $CS_2$/20 | 167,000 | 0.46 | 33 |
| 15 | $CS_2$/20 | 161,000 | 0.58 | 39.5 |

[1]polymerization at −120°C.;
[2]NMR analysis;
[3]volume of isobutylene, cyclopentadiene and cosolvent measured at −120°, −78° and 25°C. respectively It is evident that the process of this invention may be used to prepare substantially gel-free high $\overline{M}n$ copolymers of cyclopentadiene. Surprisingly, the proportion of CPD in the polymer is greater than its proportion in the monomer.

EXAMPLE 17

A terpolymer of isobutylene isoprene and cyclopentadiene was prepared using the process of this invention. The reaction was carried out at −120°C. with a monomer mix comprising 2856 ml isobutylene, 336 ml isoprene and 168 ml of cyclopentadiene; 840 ml of methylcyclohexane was used as the inert solvent and $AlCl_3$ (0.62 g $AlCl_3$/100 ml $CH_3Cl$) as the catalyst.

The product had a $\overline{M}n$ of 180,000 and was comprised of 8 mole percent isoprene and 18.7 mole percent cyclopentadiene. The gel content was less than 0.6 percent.

EXAMPLE 18

Example 17 was repeated substituting piperylene for the isoprene. The polymer had a $\overline{M}n$ of 131,000, a gel content of less than 0.7 percent and a mole percent unsaturation of 37 percent.

EXAMPLE 19

High unsaturation isobutylene-isoprene copolymers of this invention were prepared from a monomer blend comprising 15 vol percent isoprene. Copolymers of varying $\overline{M}n$ values containing about 12 mole percent isoprene were prepared. The correlation between Mn and Mooney Viscosity are depicted graphically in FIG. IV.

EXAMPLE 20

The polymers of Example 19 were formulated as follows:

| Polymer | 100 parts by weight |
|---|---|
| Zinc Stearate | 1.65 |
| HAF Carbon Black | 60 |
| Hydrocarbon Oil Plasticizer[1] | 20 |
| Antioxidant[2] | 1.11 |
| Zinc Oxide | 5 |
| Sulfur | 2.5 |
| Sulfenamide Accelerator[3] | 0.75 |

[1]Flexon 845; ASTM Type 4.
[2]Thermoflex A; 50% N-phenyl-beta-naphthylamine; 25% p,p'-dimethoxy-diphenyl amine; 25% diphenyl-p-phenylene diamine.
[3]Santocure NS; N-tertiary butylbenzothiazole-2-sulfenamide.

The samples were vulcanized under varying conditions. The results are depicted graphically in FIG. V wherein tensile strength is plotted as a function of $\overline{M}n$. It is apparent that tensile strength increases rapidly with $\overline{M}n$ and approaches an asymptotic value at about 120,000 $\overline{M}n$. Data for polymers of various $\overline{M}n$ is tabulated in Table XI. U.S. Government specifications for isoolefin-isoprene copolymer (butyl rubber) are presented for comparison.

TABLE XI

EFFECT OF NUMBER-AVERAGE MOLECULAR WEIGHT ON THE STRESS-STRAIN PROPERTIES OF AN ISOBUTYLENE-ISOPRENE COPOLYMER COMPOSITION[a]
Constant Crosslinking Time: 20 Minutes at 300°F.

| Copolymer | A | B | C | D | E | U.S. Govt. Specification[b] |
|---|---|---|---|---|---|---|
| $\overline{M}n$[c] | 47,000 | 64,000 | 87,000 | 111,000 | 161,000 | |
| Mod. 100% Ext. psi | 27 | 54 | 83 | 192 | 194 | |
| Mod. 300% Ext. psi | — | 56 | 286 | 887 | 870 | |
| Tensile Strength, psi | 27 | 56 | 510 | 1,600 | 2,090 | 1200 minimum |
| Ult. Elong. % | 282 | 410 | 510 | 525 | 630 | 450 minimum |

TABLE XI-continued

EFFECT OF NUMBER-AVERAGE MOLECULAR WEIGHT
ON THE STRESS-STRAIN PROPERTIES OF AN
ISOBUTYLENE-ISOPRENE COPOLYMER COMPOSITION[a]
Constant Crosslinking Time: 20 Minutes at 300°F.

| Copolymer | A | B | C | D | E | U.S. Govt. Specification[b] |
|---|---|---|---|---|---|---|
| Tensile Product × 10⁻³ | 7 | 23 | 260 | 840 | 1,317 | |
| Ext. Set, % | 49 | 49 | 49 | 40 | 30 | 35 maximum |

[a]Test Compound: Polymer 100, Antioxidant 1.1, Zinc Stearate 1.65, HAF Carbon Black 60, Hydrocarbon Plasticizer 20, Zinc Oxide 5, Sulfur 2.5, Sulfenamide Accelerator (Santocure NS) 0.75. Polymer composition: isobutylene; isoprene
[b]U.S. Government Specification 221-ZZ 50C (March 6, 1968) for butyl rubber.
[c]Membrane osmometry-toluene solutions at 25°C.

It is noted that only copolymers having $\bar{M}_n$ of at least 120,000 achieve the necessary high tensile without loss of elasticity (extension set). Heretofore, it was not possible to produce polymers meeting these specifications having high unsaturation, i.e. at least 5 mole percent unsaturation.

EXAMPLE 21

Figure 6:
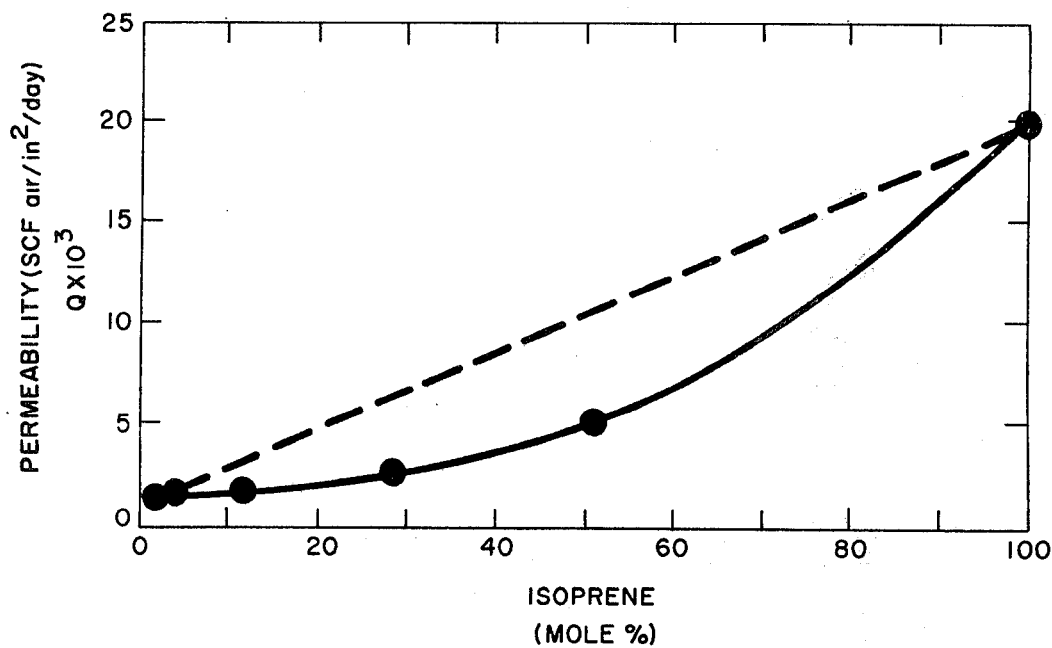
Figure 7:
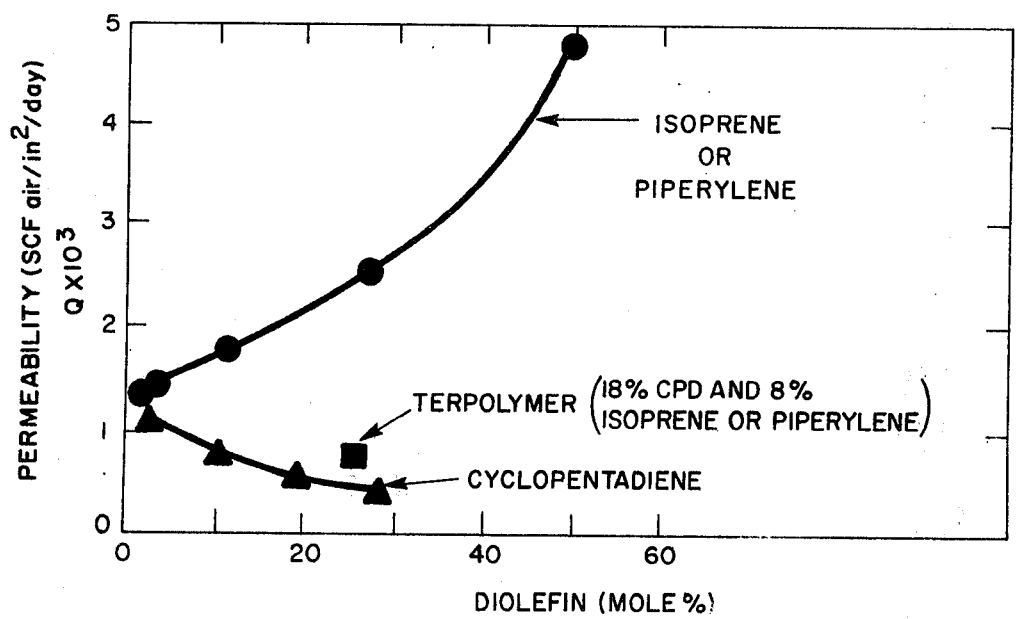
Figure 8:
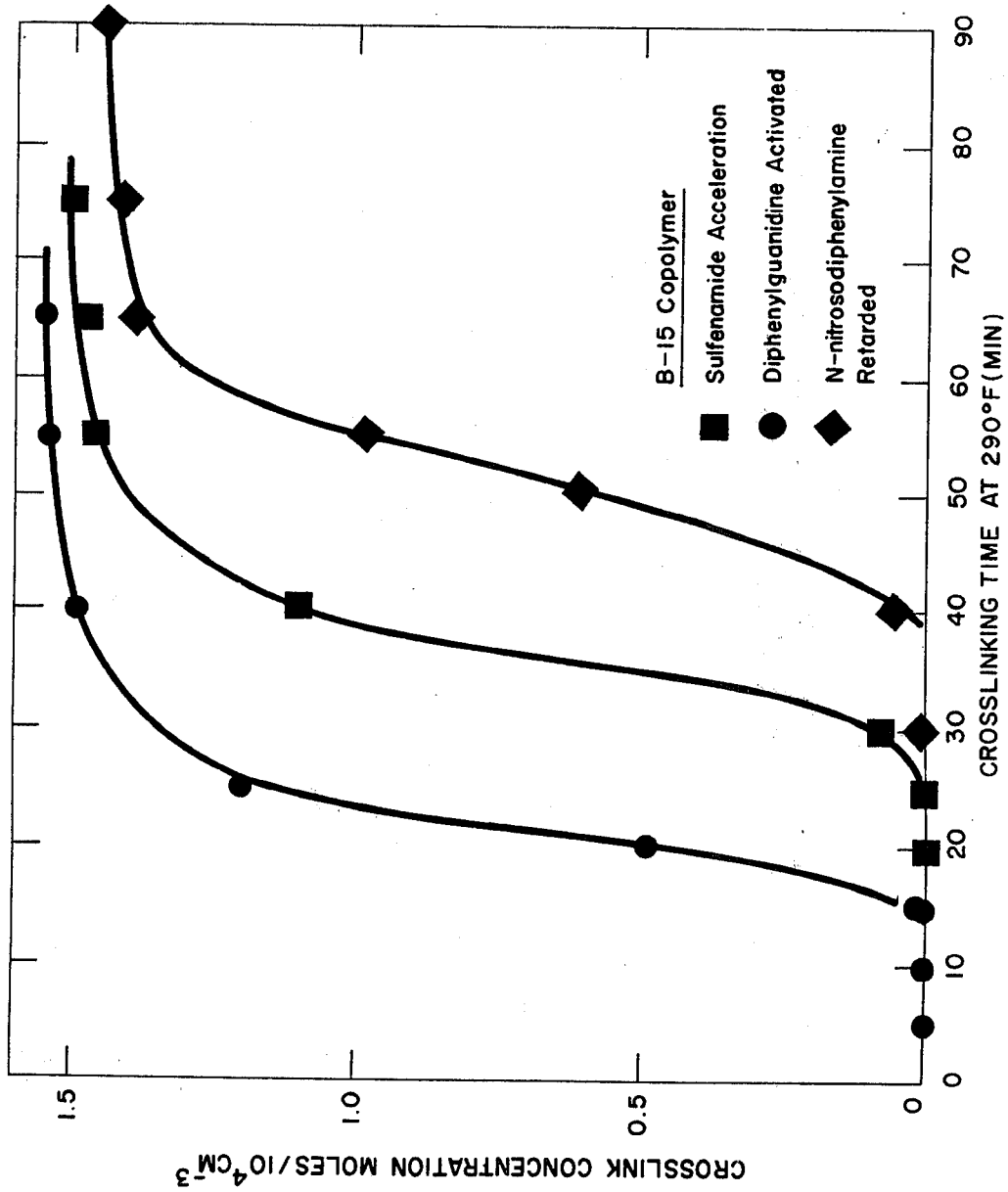
Figure 9:
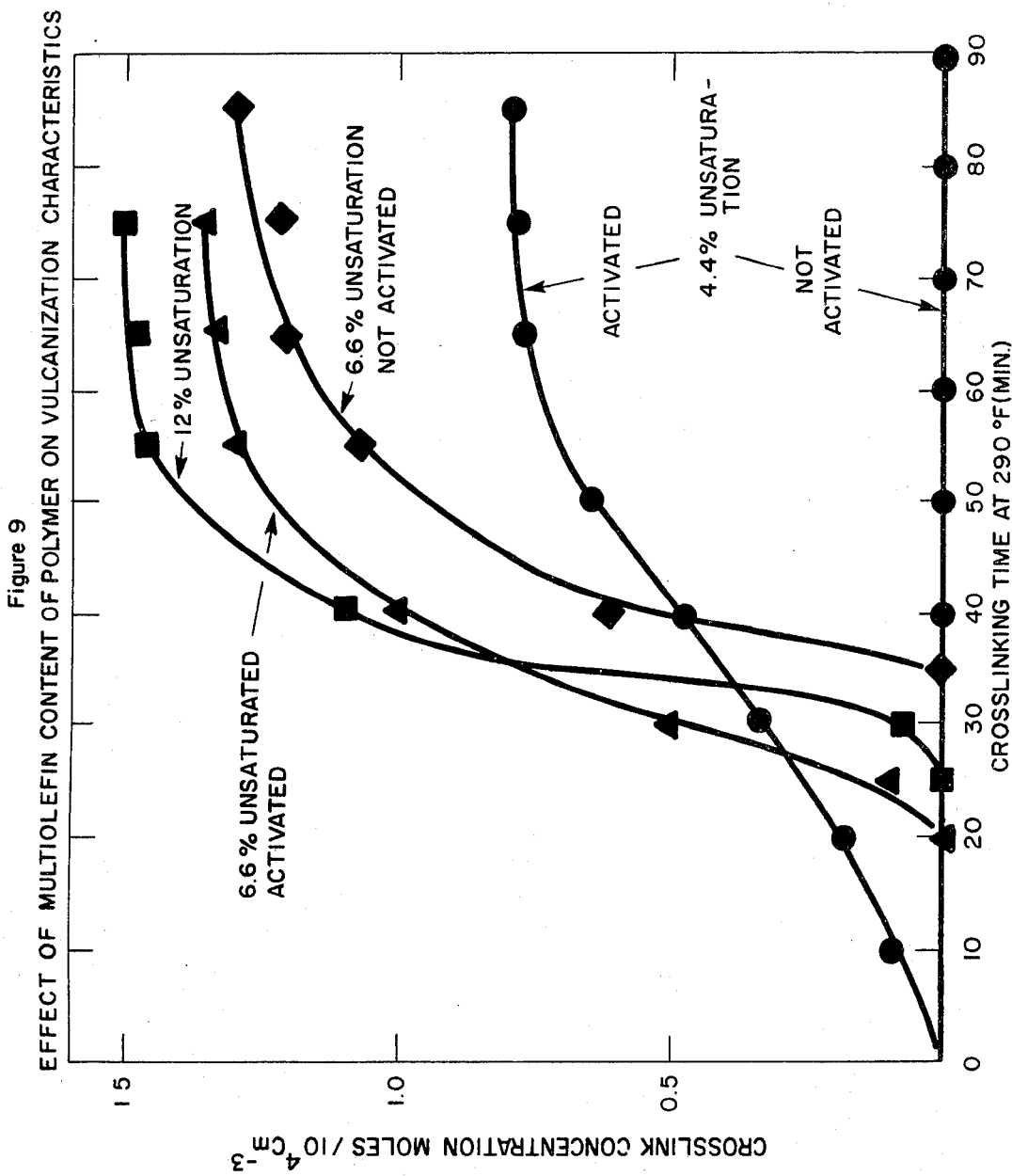

Copolymers of isobutylene and isoprene of different isoprene content were prepared and their permeability to air determined according to the method described by M. Czuha, Rubber World, May, 1954. The subject copolymers were compared to butyl rubber and to natural rubber for permeability to air at 150°F. Suitable membrane specimens were prepared by press molding and tested in a Warburg-type apparatus. The compositions used were of technological quality containing 50 parts of carbon black and appropriate crosslinking agent. The results are shown in FIG. 6. The permeability value Q is defined as the number of cubic feet of air at standard conditions which penetrates through a 0.001 inch thickness of membrane under a pressure differential of 1 lb. per sq. in. per square foot of surface per day.

The results in FIG. 6 clearly demonstrate that rather high levels of unsaturation (isoprene) can be incorporated into the copolymer with little change in permeability. Above approximately 40 percent isoprene content, permeability increases rapidly with increasing isoprene. Thus, considerable vulcanization flexibility due to increased unsaturation can be realized without significantly sacrificing impermeability characteristics.

EXAMPLE 22

The air permeability studies of Example 21 were repeated using isobutylene-conjugated diene copolymers and terpolymers. A comparison of air permeability as a function of diene content for acyclic and cyclic dienes in addition to terpolymers of acyclic and cyclic dienes is shown in FIG. VII. The terpolymers shown are isobutylene-isoprene-CPD and isobutylene-piperylene-CPD wherein the isoprene content (or piperylene content) is 8 mole percent and the CPD content is 18.7 mole percent.

It is evident that the cyclic diene result in polymers having improved (lower) air permeability, e.g., better than conventional butyl rubbers. Surprisingly, air permeability decreases with increasing cyclic diene content. Unexpectedly, replacing a portion of the cyclic diene with an acyclic diene (terpolymer) result in no significant deleterious effect on air permeability.

EXAMPLE 23

Various polymers were tested for ozone degradation by determining their resistance to cracking when exposed to ozone. Test conditions conformed to ASTM D1149-60T specification. Higher ozone levels and strains were employed than customarily utilized for butyl rubber. All elastomers were cured to the same crosslink density. The results are shown in Table XII.

TABLE XII

Ozone Cracking of Copolymers and Controls
at 122°F. Using 100 parts per 100 million
Ozone Environment[a]

| Sample | Polymer | % Unsaturation | Hours to First Cracks[b] | Final Condition |
|---|---|---|---|---|
| 1 | Enjay Butyl 035 (butyl rubber) | 1 | 240 | Broken 456 Hrs. |
| 2 | Isobutylene-CPD Copolymer | 3 | >1056 | No cracking when test terminated |
| 3 | Isobutylene-CPD Copolymer | 20 | >1056 | " |
| 4 | Isobutylene-CPD-Isoprene terpolymer | 18 CPD 8 Isoprene | >1056 | " |

[a]Orceo Company Ozone chamber
[b]Samples under 20-25% strain first 168 hrs.; 25-35% strain after 216 hrs.; and 35-50% strain after 312 hrs.

Butyl rubber is considered to be quite stable to ozone attack and is frequently used where good ozone resistance is desired. The polymers of this invention showed substantially improved results. As would be expected, CPD copolymers showed excellent ozone resistance.

Surprisingly, a terpolymer containing large quantities of isoprene, e.g., 8 percent, showed equally good ozone resistance.

EXAMPLE 24

Various isobutylene copolymers were tested for ozone resistance by the method of Example 23. The results are tabulated in Table XIII.

TABLE XIII

Ozone Cracking of Copolymers and Controls at 122°F. Using 50 Parts per 100 Million Ozone Environment

| Sample | Polymer | % Unsaturation | Hours to First Cracks | Final Condition |
|---|---|---|---|---|
| 1 | Enjay Butyl 035 | ~1% Isoprene | 383 | Broken - 1055 Hrs. |
| 2 | Enjay Butyl 268 | ~2% Isoprene | 215 | Broken - 479 Hrs. |
| 3 | Isobutylene-Isoprene-copolymer | 12% Isoprene | 6 | Broken - 73 Hrs. |
| 4 | Isobutylene-Piperylene Copolymer | 12% Piperylene | 22 | Broken - 143 hrs. |
| 5 | Isobutylene-Cyclopentadiene copolymer | 20% CPD | >1233 | Test terminated - No cracking |
| 6 | Isobutylene-Isoprene-Cyclopentadiene terpolymer | 18% CPD 8% Isoprene | >1233 | Test terminated - No cracking |

It is evident that for isoprene copolymers resistance to ozone stress cracking decreases with increased isoprene content. Piperylene copolymers are only slightly better than isoprene copolymers in this regard. Surprisingly, where terpolymers of CPD are prepared, large amounts of isoprene have little or no deleterious effect on the resistance to ozone stress cracking.

EXAMPLE 25

The versatility of sulfenamide accelerators for crosslinking elastomers resides in their ability to be modeled to the best advantage for a particular use. These systems which are well known in the art for use with the highly unsaturated general purpose elastomers cannot be used with butyl rubbers which require ultra-accelerators due to their low level of unsaturation. With ultra-accelertors, formulations must be compounded below the vulcanization temperature which often must be dangerously close to the vulcanization temperature and premature vulcanization (scorch) is frequently troublesome.

The sulfenamide systems can be operated with delayed action at the actual temperature of vulcanization and the scorch problem is completely eliminated. These systems are characterized by a distinct delay period during which no vulcanization occurs followed by rapid crosslinking to an assymptotic level of crosslink concentration. The delay period is important to the processing safety required in hot processing operations common to elastomer commerce.

It is a further advantage of these curatives that in common use the delay times are shortened or lengthened by the addition of activators or retarders without significantly affecting the shape of the crosslinking curves and rapid curing to the same high level of crosslink density occurs regardless of delay time.

An isobutylene-isoprene copolymer of this invention having a mole percent unsaturation of about 12 and a $\overline{M}n$ of about 160,000 was compounded as follows:

| Copolymer | 100 Parts by Weight |
|---|---|
| Zinc Oxide | 5.0 |
| Stearic Acid | 1.0 |
| Sulfur | 1.5 |
| Antioxidant[1] | 0.75 |
| Accelerator[2] | 1.0 |

[1]Thermoflex A
[2]N-tertiarybutylbenzothiozole-2-sulfenamide

An activator (0.5 parts diphenyl guanidine) and a retarder (0.5 parts N-nitroso-diphenylamine) were added to various blends to control cure rate. Vulcanization was carried out at 290°F. The results are shown in FIG. VIII.

It is evident that the delay time may be varied by controlling the amount of activator or retarder added. Delay times may be varied from zero to a few hours while total cure times may be varied from less than ten minutes to more than one hour. Such versatility of cure rate is not possible with the low unsaturation isoolefin-multiolefin copolymers of commerce.

EXAMPLE 26

The experiment of Example 25 was repeated with a copolymer having a number average molecular weight of 158,000 and containing 20 percent cyclopentadiene. The delay time in vulcanization at 290°F. was 55 minutes after which the rate and extent of crosslinking was similar to that shown in FIG. VIII. Activation with 1.0 parts of diphenylguanidine reduced the delay time to 30 minutes. Retardation with 0.25 parts of N-nitrosediphenylamine increased the delay time to 70 minutes.

EXAMPLE 27

The experiment of Example 26 was repeated with a copolymer having a number average molecular weight of 171,000 and containing 12 percent of piperylene. The results were similar to those obtained with the cyclopentadiene copolymer.

EXAMPLE 28

The experiment of Example 20 was repeated with a terpolymer of number average molecular weight of 166,000 and containing 8 percent of isoprene and 18 percent cyclopentadiene. The delay time was 25 minutes at 290°F. Activation with 0.5 parts of diphenylguanidine reduced the delay time to 5 minutes at 290°F. Retardation with 0.5 parts of N-nitroso-diphenyl amine increased the delay time to 50 minutes at 290°F.

EXAMPLE 29

The experiment of Example 25 was repeated with butyl rubber (~2 percent isoprene) and two copolymers of 4.4 and 6.6 percent isoprene content respectively. The copolymer of 4.4 percent unsaturation is the highest level of unsaturation available commercially (Enjay Chemical Company MD-502; Technical Bulletin D-25). The copolymer with 6.6 percent isoprene was prepared by the method of this invention. The results are shown in FIG. IX.

The unactivated butyl rubber and 4.4 percent isoprene copolymer are essentially inactive and have delay times in excess of 1.5 hours. Upon activation both the butyl rubber (not shown) and the 4.4 percent isoprene copolymer fail to achieve any level of merit of crosslink density. Furthermore, the flexibility of controlling delay time and maintaining essentially the same assymptotic crosslink density is unattainable.

In contrast at 6.6 mole percent isoprene content, the delay time can be varied and the same assymptotic cure level maintained. Furthermore, a crosslink density greater than the level of merit of $1 \times 10^{-4}$ can easily be achieved.

These results demonstrate the advantages of having levels of unsaturation of greater than 5 percent in the copolymer.

It is evident from the foregoing examples that isoolefin copolymers comprising at least 5 to about 40 mole percent multiolefin having surprising properties when compared to the low unsaturation (i.e., less than 5 percent) copolymers of the prior art. In particular the copolymers of this invention retain all the advantages of the low unsaturation copolymers (e.g., low air permeability) while having unique advantages (e.g., ability to delay cure and vary cure rate). Copolymers containing CPD are resistant to ozone attack even when large quantities of other multiolefins, e.g., isoprene, are incorporated in polymers.

What is claimed is:

1. A substantially gel-free copolymer consisting essentially of a major portion of isobutylene and about 5 to about 40 mole percent of cyclopentadiene, said copolymers having a number average molecular weight of at least 120,000.

2. The composition of claim 1 wherein a vulcanizing amount of a sulfur donor and a delayed action accelerator are incorporated therein.

3. The composition of claim 2 wherein the delayed action accelerator is a benzothiozole sulfenamide present at about 0.5 to about 3 weight percent based on the polymer.

4. The composition of claim 2 wherein a retarder having a pKa value of less than 7 is incorporated therein.

5. The composition of claim 2 wherein an activator is included, said activator being selected from the group consisting of
  1. oxides, hydroxide and alkoxides of metals of Group IA and Group IIA of the Periodic Table of the Elements; and
  2. organic compounds having a pKa value of about 8 to about 14.

6. The composition of claim 4 wherein the retarder has a pKa value of about 3 to about 5.

7. The composition of claim 5 wherein the activator has a pKa value of about 9 to about 11.

8. The composition of claim 2 wherein the accelerator is N,N-diethylbenzothiazole-2-sulfenamide, N-tertiary butyl benzothiazole-2-sulfenamide, 2-(morpholino)benzothiazole-2-sulfenamide, N-N diisopropyl benzothiazole-2-sulfenamide, N-cyclohexyl benzothiazole-2-sulfenamide, N,N-dicyclohexyl benzothiazole-2-sulfenamide, 2(2,6 dimethyl morpholino) benzothiazole sulfenamide or 2-piperidinyl benzothiazole sulfenamide.

9. The composition of claim 4 wherein the retarder is N-nitroso diphenylamine, N-cyclohexyl thiophthalimide, phthalic anhydride or salicylic acid.

10. The composition of claim 5 wherein the activator is diphenylguanidine, hexane-1-amine, sodium methoxide or MgO.

* * * * *

UNITED STATES PATENT OFFICE
CERTIFICATE OF CORRECTION

Patent No. 3,928,297  Dated December 23, 1975

Inventor(s) Warren A. Thaler et al.

It is certified that error appears in the above-identified patent and that said Letters Patent are hereby corrected as shown below:

The term of this patent subsequent to

April 30, 1991, has been disclaimed.

Signed and Sealed this seventeenth Day of February 1976

[SEAL]

Attest:

RUTH C. MASON
*Attesting Officer*

C. MARSHALL DANN
*Commissioner of Patents and Trademarks*